(12) United States Patent
Viana et al.

(10) Patent No.: US 6,873,250 B2
(45) Date of Patent: Mar. 29, 2005

(54) BACK-UP AID INDICATOR USING FMCW CHIRP SIGNAL OR A TIME DOMAIN PULSE SIGNAL

(75) Inventors: Luis M. Viana, Wakefield, MA (US); Michael J. Delcheccolo, Westford, MA (US); Walter G. Woodington, Lincoln, MA (US); Mark E. Russell, Westford, MA (US)

(73) Assignee: Raytheon Company, Waltham, MA (US)

( * ) Notice: Subject to any disclaimer, the term of this patent is extended or adjusted under 35 U.S.C. 154(b) by 49 days.

(21) Appl. No.: 10/320,750

(22) Filed: Dec. 16, 2002

(65) Prior Publication Data

US 2003/0146826 A1 Aug. 7, 2003

Related U.S. Application Data

(60) Provisional application No. 60/340,543, filed on Dec. 14, 2001.

(51) Int. Cl.$^7$ .................................... B60Q 1/00
(52) U.S. Cl. .................... 340/435; 340/436; 340/903; 342/70
(58) Field of Search .......................... 340/435, 436, 340/903, 904, 932.2; 342/70, 27–28

(56) References Cited

U.S. PATENT DOCUMENTS

| | | | | |
|---|---|---|---|---|
| 4,308,536 A | * | 12/1981 | Sims et al. | ............ 342/70 |
| 4,409,899 A | | 10/1983 | Owen et al. | |
| 5,166,690 A | | 11/1992 | Carlson et al. | |
| RE34,773 E | | 11/1994 | Dombrowski | |
| 5,394,292 A | * | 2/1995 | Hayashida | ............ 361/179 |
| 5,517,197 A | * | 5/1996 | Algeo et al. | ............ 342/70 |
| 5,682,136 A | * | 10/1997 | Del Signore | ............ 340/436 |
| 5,812,083 A | | 9/1998 | Johnson et al. | |
| 5,999,092 A | * | 12/1999 | Smith et al. | ............ 340/436 |
| 6,069,581 A | | 5/2000 | Bell et al. | |
| 6,094,158 A | * | 7/2000 | Williams | ............ 342/70 |
| 6,130,607 A | | 10/2000 | McClanahan et al. | |
| 6,211,833 B1 | * | 4/2001 | Haupt | ............ 343/713 |
| 6,215,438 B1 | * | 4/2001 | Oswald et al. | ............ 342/70 |
| 6,268,793 B1 | | 7/2001 | Rossi | |
| 6,268,803 B1 | * | 7/2001 | Gunderson et al. | ............ 340/903 |
| 6,297,732 B2 | | 10/2001 | Hsu et al. | |
| 6,339,369 B1 | | 1/2002 | Paranjpe | |

FOREIGN PATENT DOCUMENTS

| | | | |
|---|---|---|---|
| EP | 0 575 814 A1 | 12/1993 | |
| EP | 575814 A1 | * 12/1993 | ........... G01S/13/93 |
| GB | 2 248 974 A | 4/1992 | |
| WO | WO 01/15275 A1 | 3/2001 | |

OTHER PUBLICATIONS

Steven A. Zelubowski, Low Cost Antenna Alternatives For Automotive Radars, Jul. 1994, Norwood, Massachusetts, US.

A. Rivenq–Menhaj; J.M. Rouvaen, J. Assaad, M. Heddebaut and C. Bruneel, Combining Two Radar Techniques to Implement A Collision Avoidance System, Apr. 27, 1998, UK.

(Continued)

*Primary Examiner*—Jeffery Hofsass
*Assistant Examiner*—Eric Blount
(74) *Attorney, Agent, or Firm*—Daly, Crowley, Mofford & Durkee, LLP

(57) ABSTRACT

A back-up aid indication system includes a sensor for providing detection coverage in a predetermined coverage zone behind a vehicle. The sensor includes a transmit antenna adapted for transmitting an RF signal having a quasi-collimated antenna pattern in a near field. The system further includes a waveform generator which selectively provides one of a frequency modulated continuous wave FMCW Chirp signal and a pulse waveform signal as the transmitted RF signal.

31 Claims, 23 Drawing Sheets

OTHER PUBLICATIONS

Frederic J. Harris, On The Use Of Windows For Harmonic Analysis With The Discrete Fourier Transform, vol. 66, No. 1, Jan. 1978.
Dedication to Dr. Henry Jasik (1919–1977), 1993.
International Search Report of PCT Application No. PCT/US02/40094 dated Oct. 9, 2003.
Partial International Search Report of PCT Application No. PCT/US02/40094 dated Aug. 6, 2003.
A Rivenq–Menhaj, JM Rouvaen, J. Assaad, M. Heddebaut and C. Bruneel, Combining Two Radar Techniques to Implement a Collision Avoidance System, Apr. 27, 1998, pp. 1343–1346, France.
Dedicated To Dr. Henry Jasik (1919–1977), pp. 1–5.
Frederic J. Harris, Member, IEEE, On the Use of Windows for Harmonic Analysis with the Discreet Fourier Transform, Jan., 1978, 1–34.

* cited by examiner

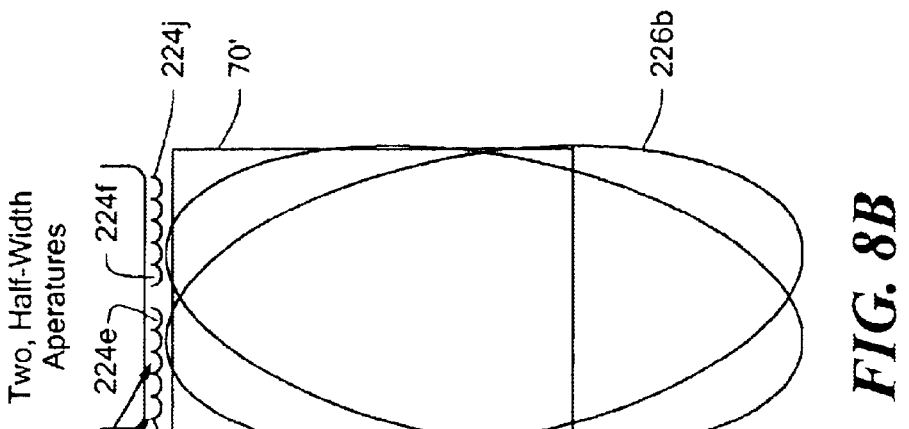
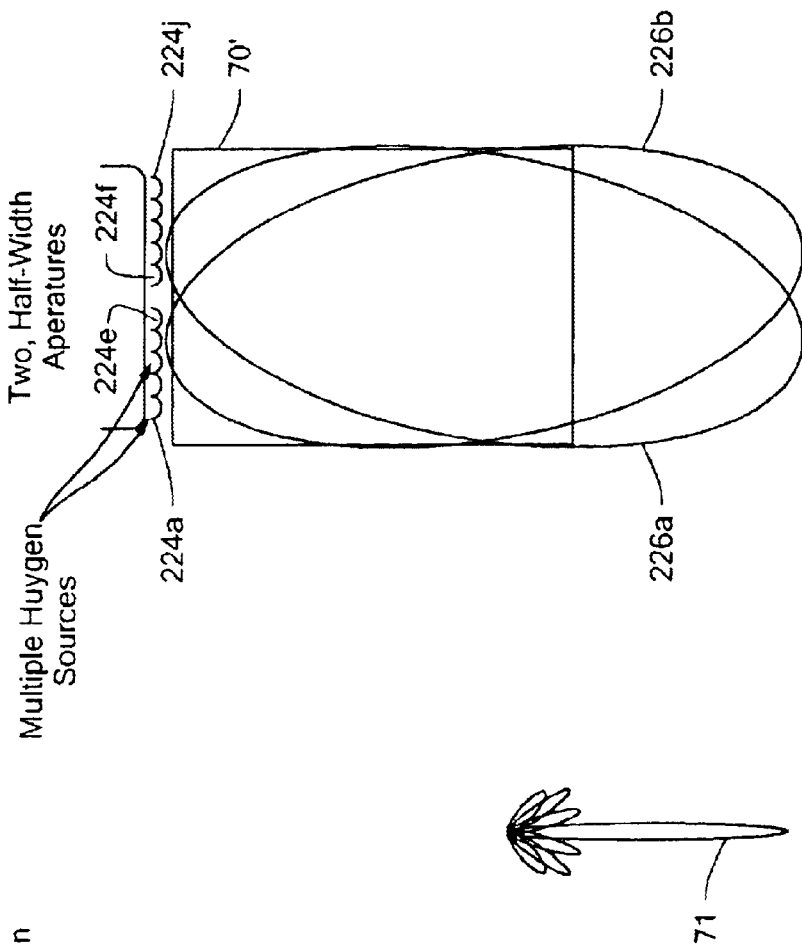
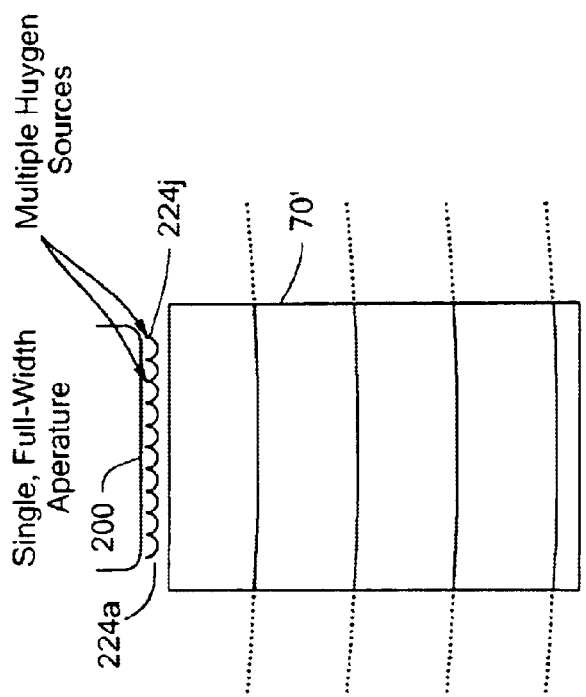
*FIG. 8B*
*FIG. 8C*
*FIG. 8A*

Bumper Details

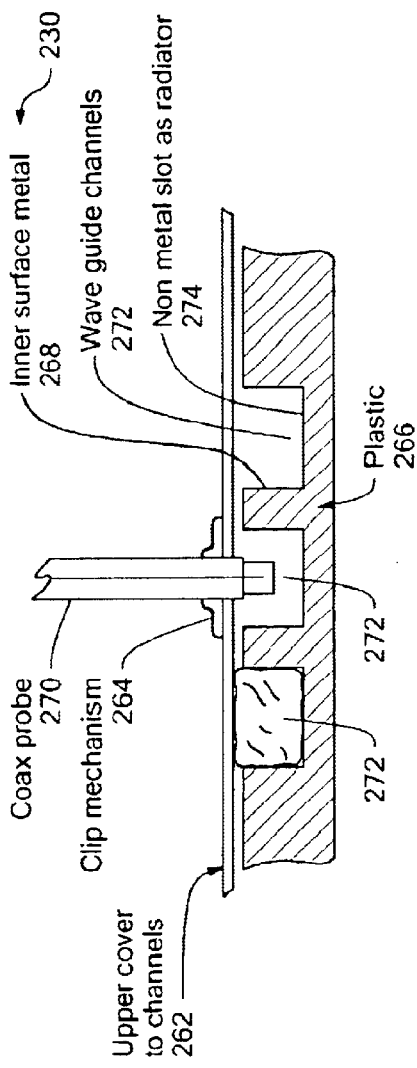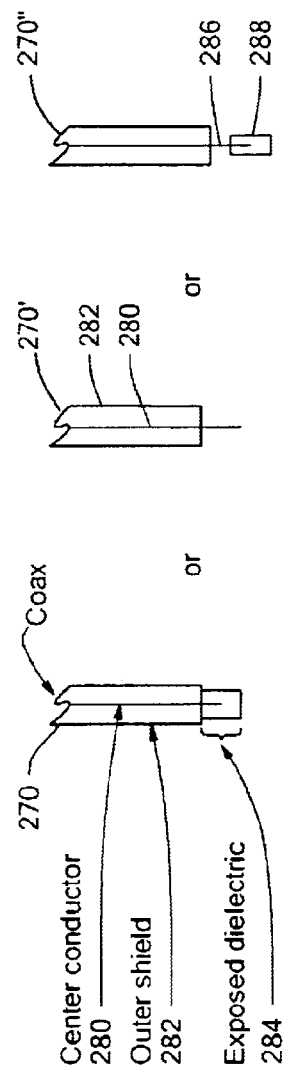
FIG. 12  FIG. 12A  FIG. 12B  FIG. 12C

BACK-UP AID INDICATOR USING FMCW CHIRP SIGNAL OR A TIME DOMAIN PULSE SIGNAL

CROSS-REFERENCE TO RELATED APPLICATIONS

This application claims the benefit of U.S. Provisional Application No. 60/340,543, filed on Dec. 14, 2001 which application is hereby incorporated herein by reference in its entirely.

FIELD OF THE INVENTION

This invention relates to radar systems and more particularly to a radar for use as a back-up aid indicator in a vehicle.

BACKGROUND OF THE INVENTION

With the dangers associated with automobile travel, there is an ongoing need for enhanced automobile driver aides. One possible area of increased driver aides involves detection of objects behind a vehicle. As the vehicle approaches objects, moving forward or backing up, (e.g. other vehicles, pedestrians and obstacles) or as objects approach the vehicle a driver cannot always detect the object and take precautions necessary to avoid a collision with the object. To enhance the safety of trucks, for example, sensor systems or more simply "sensors" for detecting objects around a truck have been suggested. Such sensors typically include an acoustic, optical or infrared (IR) detector for detecting obstacles in the path of the vehicle moving forward or backwards. Prior art systems using acoustic and optical sensors have missing coverage areas close to the bumper and areas toward the far end of the coverage zone. The acoustic sensors have limited depth coverage and weather conditions degrade the performance of these sensors.

As is known in the art, there is an increasing trend to include radar systems in commercially available sensor products. For example, it is desirable to include radar systems in automobiles, trucks boats, airplanes and other vehicles. Such radar systems must be compact and relatively low cost. Furthermore, some applications have relatively difficult design parameters including restrictions on the physical size of the structure in addition to minimum operational performance requirements. Such competing design requirements (e.g. low cost, small size, high performance parameters) make the design of such radar systems relatively challenging. Among, the design challenges is the challenge to provide an antenna system which meets the design goals of being low cost, compact and high performance.

In such safety applications, it is necessary to provide a sensor capable of accurately and reliably detecting objects in the path of the vehicle. Radar is a suitable technology for implementing a sensor for use in vehicles such as automobiles and trucks. One type of radar suitable for this purpose is a Frequency Modulated Continuous Wave (FMCW) radar. In a typical FMCW radar, the frequency of the transmitted CW signal linearly increases from a first predetermined frequency to a second predetermined frequency. FMCW radar has the advantages of high sensitivity, relatively low transmitter power and good range resolution.

In automotive radar systems cost and size considerations are of considerable importance. Furthermore, in order to meet the performance requirements of automotive radar applications, (e.g. coverage area) an array antenna is required. Some antenna elements which have been proposed for use in antenna arrays manufactured for automotive radar applications include patch antenna elements, printed dipole antenna elements and cavity backed patch antenna elements. Each of these antenna elements has one or more limitations when used in an automotive radar application. Array antennas for automotive applications have only a limited amount of area for reasons of compactness and cost. Printed dipole antennas can operate in a high density circuit configuration, however, array antennas provided from printed dipole antenna elements sometimes give rise to "blind spots" in the antenna radiation pattern.

Sensors disposed on vehicles are consumer products that may affect the safety of the passengers, and the accuracy and reliability of these sensors are important. Aspects of the sensors which contribute to its accuracy and reliability include its susceptibility to noise and the overall precision with which received radio frequency (RF) signals are processed to detect objects within the field of view of the sensor. Susceptibility to noise for example can cause false detections or more deleteriously, cause an object to go undetected.

Further significant attributes of the sensors are related to its physical size and form factor. Preferably, the sensor is housed in a relatively small enclosure or housing mountable behind a surface of the vehicle. For accuracy and reliability, it is imperative that the transmit antenna and receive antenna and circuitry of the sensor are unaffected by attributes of the vehicle and that the sensors are mounted to the vehicle in a predictable alignment. In addition, when used as a back-up aid indicator, the sensor requires a coverage area which is compatible with the operation of backing up and parking a vehicle. Conventional FMCW radar systems have a minimum detection range which is unsuitable for back-up assistance. For example in some systems the minimum detection range is beyond 1.5 meters.

The use of radar systems to aid in parking, backing-up, changing lanes, and detecting objects on the side of the vehicle, requires in addition to a reliable low cost radar, a solution to a variety of geometric coverage problems matched to the particular application. Prior art systems using uncollimated signals provide beams having a typical aperture taper forming beams which spread such that the sides of the coverage area are not parallel and the width of the coverage area is relatively narrow. Thus the coverage of the prior art systems poorly matches a desired rectilinear back-up coverage area.

It would, therefore, be desirable to provide a sensor system which is capable of detecting the presence of objects behind a stationary or moving vehicle and further to detect the speed of these objects if the objects are moving. It would thus be desirable to alert the operator of the vehicle so the operator can safely maneuver the vehicle. It would be further desirable to provide a back-up aid system which is compact, which can operate in a high density circuit configuration, and which is relatively low cost. It would be still further desirable to provide a coverage zone including common parking and back-up coverage for reducing false detections. It would be further desirable, to provide an antenna which is low cost and can be flexibly mounted on a vehicle to provide a minimum detection range which is suitable for back-up and parking assistance.

SUMMARY OF THE INVENTION

In accordance with the present invention, a back-up aid indication system includes a sensor for providing detection coverage in a predetermined coverage zone behind a vehicle. The sensor includes a transmit antenna adapted for transmitting an RF signal having a quasi-collimated antenna pattern in a near field. The system further includes a waveform generator which selectively provides one of a frequency modulated continuous wave FMCW Chirp signal and a pulse waveform signal as the transmitted RF signal. With such an arrangement, a compact back-up aid indication system is provided for detecting the presence of objects behind a stationary or moving vehicle and for detecting the speed of these objects if the objects are moving, and for increasing the energy directed to a target in a coverage zone including common parking and back-up coverage for reducing false detections. This arrangement further reduces the transmit-to-receive leakage, reduces a spectral smearing of a received echo, reduces the size of poorly covered portions of a coverage area, sharpens gain roll-off at the coverage area's left and right boundaries, and supports both narrow and wide band waveforms.

In accordance with a further aspect of the present invention, an external vehicle antenna includes a housing disposed across a bumper fascia, a plurality of flexible waveguide channels disposed within the housing each channel having a pair of inner surfaces and a slot surface. The antenna further includes at least one coax probe coupled to predetermined ones of the plurality of flexible waveguide channels. With this arrangement, an antenna is provided which is low cost and can be flexibly mounted on a vehicle to provide a minimum detection range which is suitable for back-up and parking assistance.

In one embodiment, the antenna element is provided from a plastic, injection-molded, slightly-flexible metalized waveguide antenna mounted on a vehicle bumper. In another embodiment, the antenna element is provided from a plastic, multilayer tape, slightly flexible stripline antenna mounted on the vehicle bumper.

BRIEF DESCRIPTION OF THE DRAWINGS

The foregoing features of this invention, as well as the invention itself, may be more fully understood from the following description of the drawings in which:

FIG. 8A is a plot of antenna system beams provided by combining predetermined ones of the external antenna elements and the resulting detection zone which can be provided by the BUA system of FIG. 1;

FIG. 8B is a plot of external antenna system beams provided by combining predetermined ones of the external antenna elements and the resulting detection zone which can be provided by the BUA system of FIG. 1;

FIG. 8C is a plot of a far field pattern provided by combining predetermined ones of the external antenna elements and the resulting detection zone which can be provided by the BUA system of FIG. 1;

FIG. 12 is cross-sectional view of a coax probe coupled to the external transmit antenna element of FIG. 10;

FIGS. 12A, 12B and 12C are views of the coaxial probe of FIG. 12;

DETAILED DESCRIPTION OF THE INVENTION

Before providing a detailed description of the invention, it should be noted that the system described herein as a back-up aid (BUA) can also operate as a parking aid (PA) with or without additional sensors by changing the operational control of the sensors and the feedback or sensory indications supplied to the operator of a vehicle.

Figure 1:
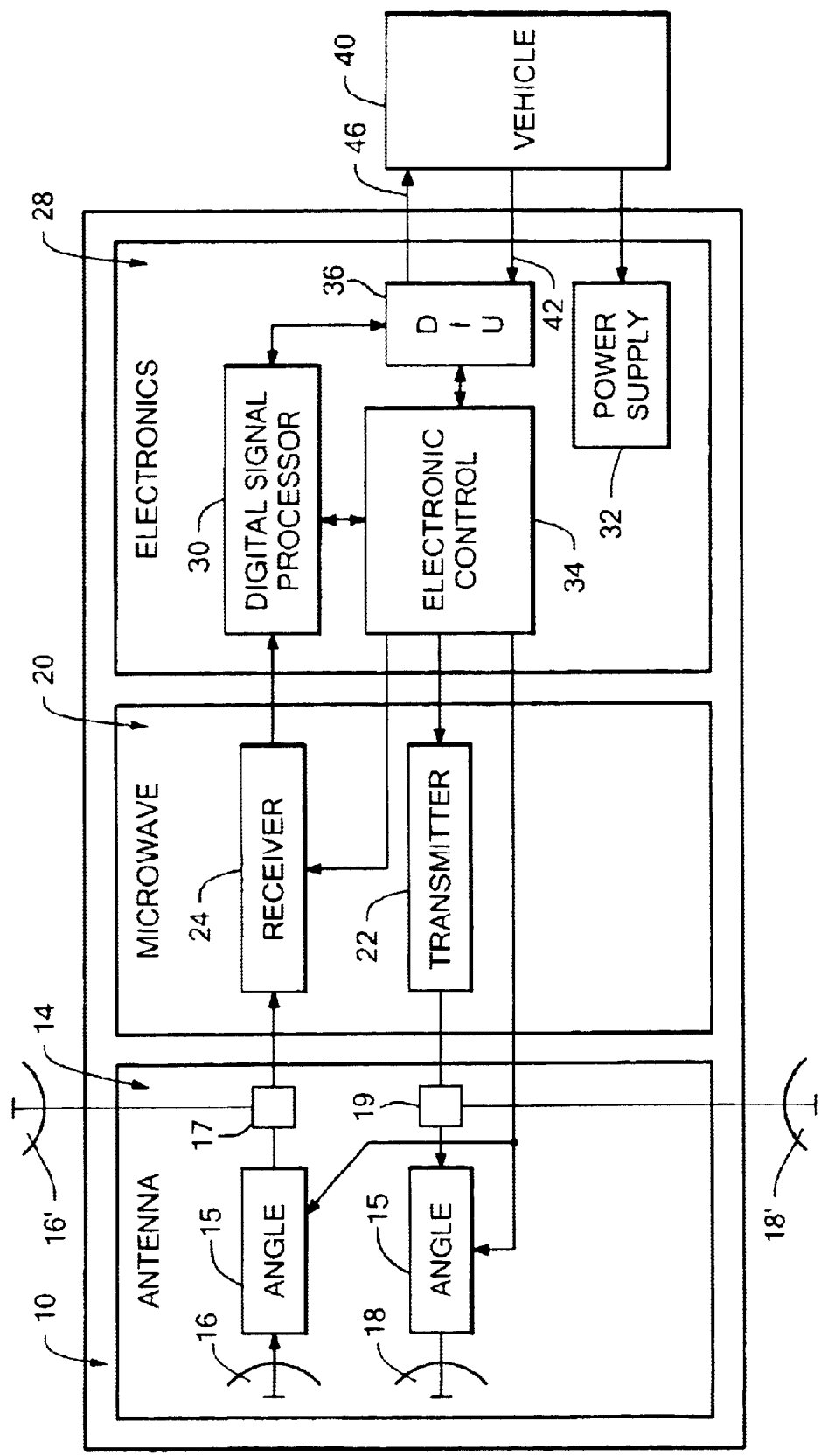
FIG. 1 is a block diagram of a back-up aid indicator (BUA) system.

Referring to FIG. 1, a radar system 10 includes an antenna assembly 14, a microwave section 20 having both a transmitter 22 and a receiver 24, and an electronics section 28 including a digital signal processor (DSP) 30, a power supply 32, control circuits 34 and a digital interface unit (DIU) 36. The transmitter 22 includes a digital ramp signal generator for generating a control signal for a voltage controlled oscillator (VCO), as will be described.

The antenna assembly 14 includes an internal receive antenna 16 for receiving RF signals and an internal transmit antenna 18 for transmitting RF signals. The antenna assembly 14 also includes a switch 17 coupled to the receiver 24 and selectively coupled to the internal receive antenna 16 and to an external receive antenna 16' for receiving RF signals, and a switch 19 selectively coupled to the internal transmit antenna 18 and to an external transmit antenna 18' for transmitting RF signals. The switches 17, 19 select either operation with the internal or external antennas. The radar system 10 may be characterized as a bistatic radar system since it includes separate transmit and receive antennas positioned proximate one another. The antennas 16, 18 provide multiple beams at steering angles that are controlled in parallel as to point a transmit and a receive beam in the same direction. Various circuits 15 for selecting the angle of the respective antennas 16, 18 are suitable, including a multi-position switch. The antennas 16', 18' provide multiple beams to provide a back-up coverage area (also referred to as a coverage zone and described in conjunction with FIGS. 3 and 4). It will be appreciated by those of ordinary skill in the art that signals to the external transmit antenna 18' and from the external receive antenna 16' can be coupled to optional control and subarray selector circuits (not shown) to provide selection and control of antenna subarrays within the external antennas.

The radar system 10 utilizes radar technology to detect one or more objects, or targets in the field of view of the system 10 and may be used in various applications. In the illustrative embodiment, the radar system 10 is a module of an automotive radar system (FIG. 2) and, in particular, is a back-up aid (BUA)/parking aid (PA) system (herein after also referred to as BUA system 10) adapted for mounting on an automobile or other vehicle 40 and having the external receive antenna 16' and the external transmit antenna 18' disposed on a rear bumper or rear portion of a vehicle for the purpose of detecting objects, including but not limited to other vehicles, trees, signs, pedestrians, or other objects which could be located proximate a path on which the vehicle is located when backing up or parking.

The BUA 10 can also be used for a side object detection (SOD) system adapted for mounting on an automobile or other vehicle 40 for the purpose of detecting objects which can be located proximate a path along the side of the vehicle. It should be noted that the SODS application requires the system to switch beams in a fan configuration out the side of the vehicle, while the radar system 10 with the external receive antenna 16' and the external transmit antenna 18' on the bumper provides either one wide paralleled-edge beam to cover a back-up area of approximately a three and ten meter zone, or M-subbeams, for example four subbeams, roughly paralleled-edged, to cover the same zone.

As will be apparent to those of ordinary skill in the art, the radar system 10 is also suitable for use in many different types of applications including but not limited to marine applications in which the radar system 10 can be disposed on a boat, ship or other sea vessel.

In one mode, the transmitter 22 operates as a Frequency Modulated Continuous Wave (FMCW) radar, in which the frequency of the transmitted signal linearly increases from a first predetermined frequency, here for example 24.05 GHz, to a second predetermined frequency, here for example, 24.25 GHz. FMCW radar has the advantages of high sensitivity, relatively low transmitter power and good range resolution. However, it will be appreciated that other types of transmitters may be used.

Control signals are provided by the vehicle 40 to the radar system 10 via a control signal bus 42 and may include a yaw rate signal corresponding to a yaw rate associated with the vehicle 40 and a velocity signal corresponding to the velocity of the vehicle. The DSP 30 processes these control signals and radar return signals received by the receiver 24, in order to detect objects within the field of view of the radar system 10. The radar system 10 provides to the vehicle one or more output signals characterizing an object within its field of view using an output signal bus 46 to the vehicle. These output signals may include a range signal indicative of a range associated with the target, a range rate signal indicative of a range rate associated with the target and an azimuth signal indicative of the azimuth associated with the target relative to the vehicle 40. The output signals may be coupled to a control unit of the vehicle 40 for various uses such as a collision avoidance system.

Figure 2:
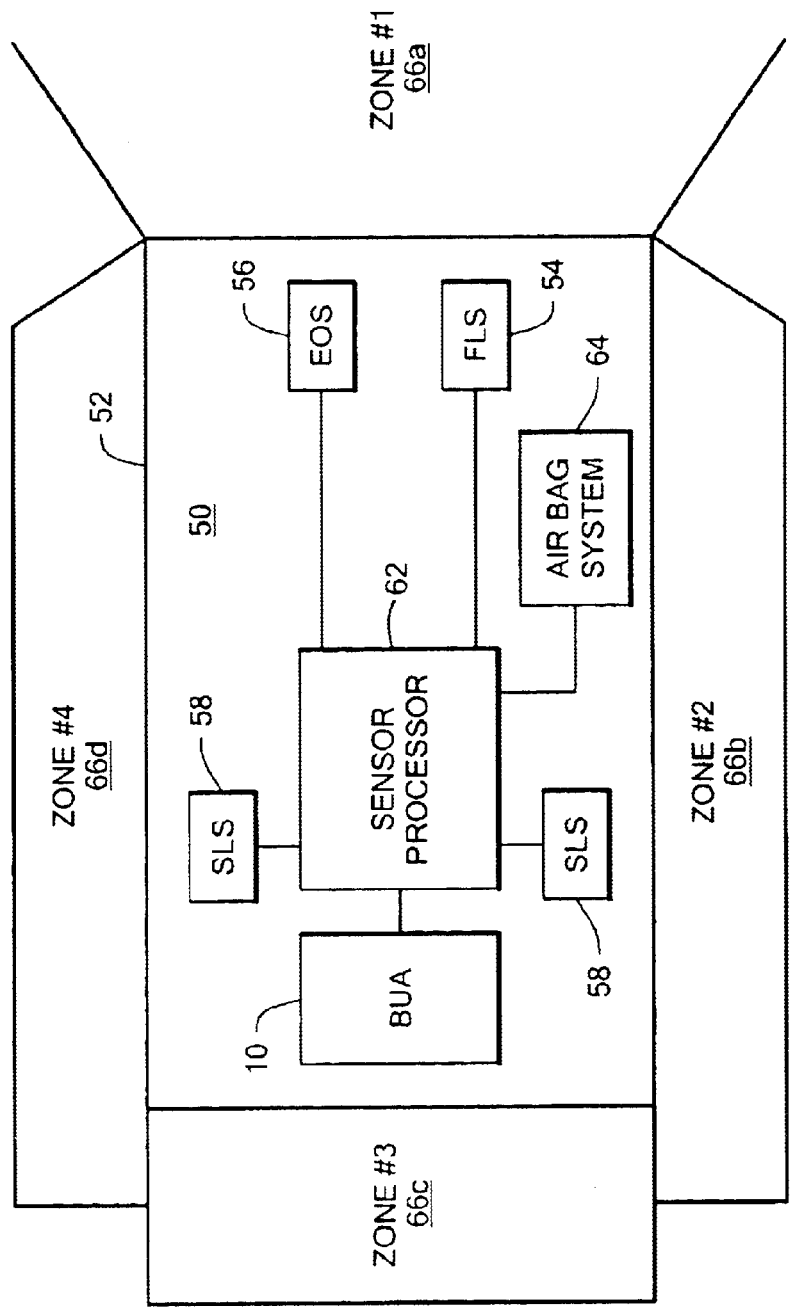
FIG. 2 is a block diagram of a near object detection system including the automotive BUA of FIG. 1.

Referring now to FIG. 2, an illustrative application for the BUA system 10 of FIG. 1 is shown as part of an automotive near object detection (NOD) system 50. The NOD system 50 is disposed on a vehicle 52 which may be provided for example, as an automotive vehicle such as car, motorcycle, or truck, a marine vehicle such as a boat or an underwater vehicle or as an agricultural vehicle such as a harvester. In this particular embodiment, the NOD system 50 includes a forward-looking sensor (FLS) system 54 which may be of the type described in U.S. Pat. No. 6,011,507 entitled Radar System and Method of Operating Same, issued Jan. 4, 2000, assigned to the assignee of the present invention, and incorporated herein by reference; an electro-optic sensor (EOS) system 56, a plurality of side-looking sensor (SLS) systems 58 or equivalently side object detection (SOD) systems 58 as described in U.S. patent application Ser. No. 09/931,631, entitled Near Object Detection (NOD) System, filed Aug. 16, 2001 assigned to the assignee of the present invention and incorporated herein by reference in its entirety. The BUA system 10 of the present invention replaces or supplements the rear looking sensor (RLS) in U.S. patent application Ser. No. 09/931,631.

Each of the FLS 54, EOS 56, SLS 58, and BUA 10 systems is coupled to a sensor processor 62. In this particular embodiment, the sensor processor 62 is shown as a central processor to which each of the FLS 54, EOS 56, SLS 58, and BUA 10 systems is coupled via a bus or other means. It should be appreciated that in an alternate embodiment, one or more of the FLS 54, EOS 56, SLS 58, and BUA 10 systems may include its own processors, such as the DSP 30 of FIG. 1, to perform the processing described below. In this case, the NOD system 50 would be provided as a distributed processor system.

Regardless of whether the NOD system 50 includes a single processor or multiple processors, the information collected by each of the FLS 54, EOS 56, SLS 58, and BUA 10 systems is shared and the sensor processor 62 (or processors in the case of a distributed system). The NOD system 50 may be used for a number of functions, including but not limited to, blind spot detection, lane change detection, pre-arming of vehicle air bags and to perform a lane stay function. For example, the sensor processor 62 may be coupled to the airbag system 64 of the vehicle 52. In response to signals from one or more of the FLS 54, EOS 56, SLS 58, and BUA 10 systems, the sensor processor 62 determines whether it is appropriate to "pre-arm" the airbag of the vehicle. Other examples are also possible.

The EOS system 56 includes an optical or infrared (IR) or other sensor which provides relatively high resolution in the azimuth plane of the sensor. The FLS system 54 may be of the type described in U.S. Pat. No. 5,929,802 entitled Automotive Forward Looking Sensor Architecture, issued Jul. 27, 1999, assigned to the assignee of the present invention, and incorporated herein by reference.

Each of the sensor systems is disposed on the vehicle 52 such that a plurality of coverage zones exists around the vehicle. Thus, the vehicle is enclosed in a cocoon-like web or wrap of sensor zones. With the particular configuration shown in FIG. 2, four coverage zones 66a–66d are used. Each of the coverage zones 66a–66d utilizes one or more RF detection systems. The RF detection system utilizes an antenna system which provides multiple beams in each of the coverage zones 66a–66d. In this manner, the particular direction from which another object approaches the vehicle or vice-versa can be found. In particular ZONE #3 can correspond to the back-up coverage area described in conjunction with FIGS. 3 and 4.

It should be appreciated that the FLS 54, EOS 56, SLS 58, and BUA 10 systems may be removably deployed on the vehicle. That is, in some embodiments the SLS, FLS and BUA sensors may be disposed external to the body of the vehicle (i.e. on an exposed surface of the vehicle body), while in other systems the FLS 54, SLS 58, and BUA 10 systems may be embedded into bumpers or other portions of vehicle (e.g. doors, panels, quarter panels, vehicle front ends, and vehicle rear ends). It is also possible to provide a system which is both mounted inside the vehicle (e.g., in the bumper or other location) and which is also removable. The system for mounting can be of a type described in U.S. patent application Ser. No. 09/931,276 entitled Portable Object Detection System and filed Aug. 16, 2001 or in U.S. patent application Ser. No. 09/930,868, entitled System and Technique for Mounting a Radar System on a Vehicle filed Aug. 16, 2001. Each of the above-identified patent applications assigned to the assignee of the present invention, and each incorporated herein by reference.

Figure 3:
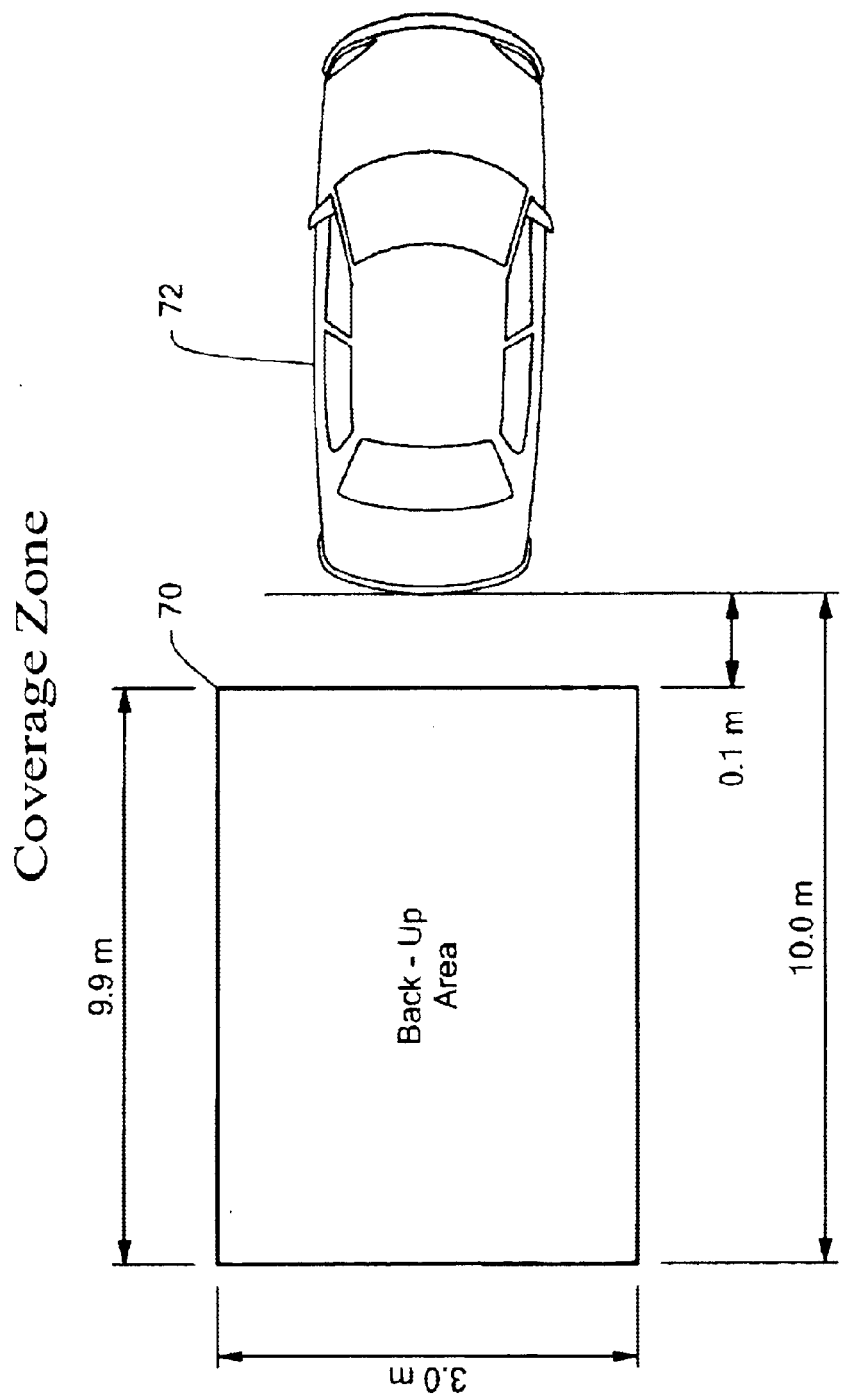
FIG. 3 is a schematic top view of a back-up coverage area of the BUA system of FIG. 1.

Referring now to FIG. 3, an exemplary back-up area 70 (also referred to as a back-up coverage zone 70) is located behind a vehicle 72 and is slightly wider, here approximately three meters, than the vehicle 72 and extends behind the vehicle 72 for a distance of approximately 9.9 meters beginning approximately 0.1 meters behind the rear bumper of the vehicle 72.

Figure 4:
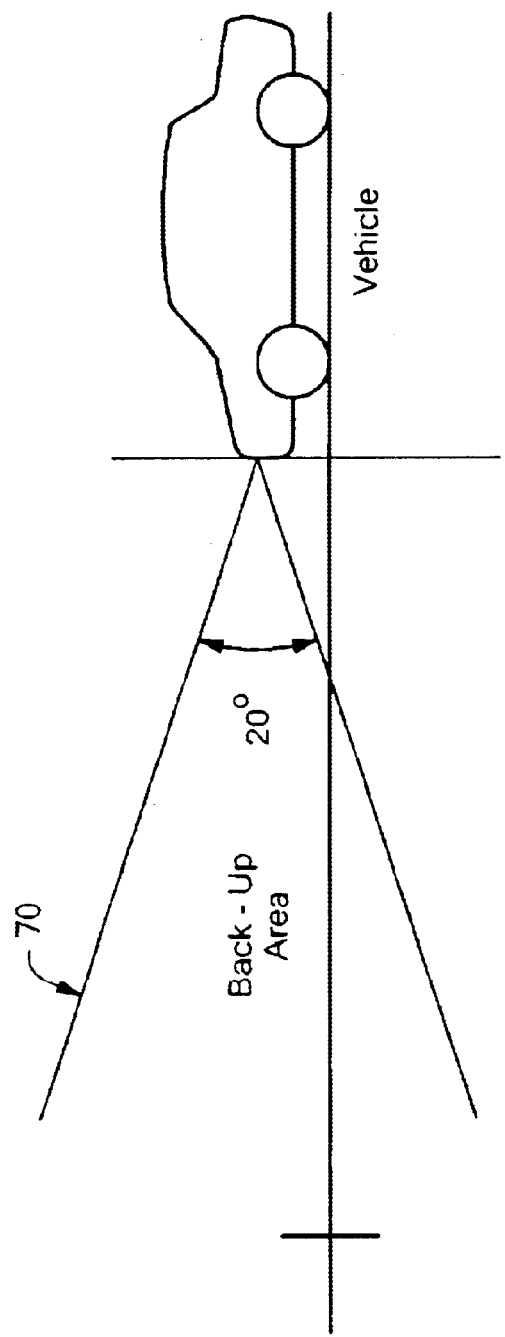
FIG. 4 is a schematic side view of a back-up coverage area of the BUA system of FIG. 1.

Referring now to FIG. 4, the exemplary back-up area 70 of FIG. 4 located behind the vehicle 72 is illustrated in cross section to show the beam elevation. The back-up area 70 has a coverage zone of approximately twenty degrees in elevation from the rear bumper of the vehicle. It will be appreciated by those of ordinary skill in the art that the back-up area 70 provided by the BUA system 10 can be configured having varying widths, lengths and elevations to meet the requirements of various applications.

Figure 5B:
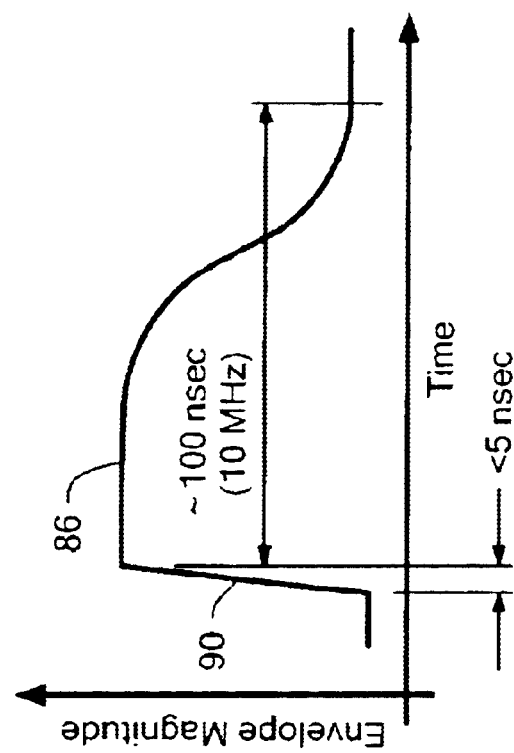
FIG. 5B is a plot of a Time Domain Pulse signal provided by the BUA system of FIG. 1.
Figure 5A:
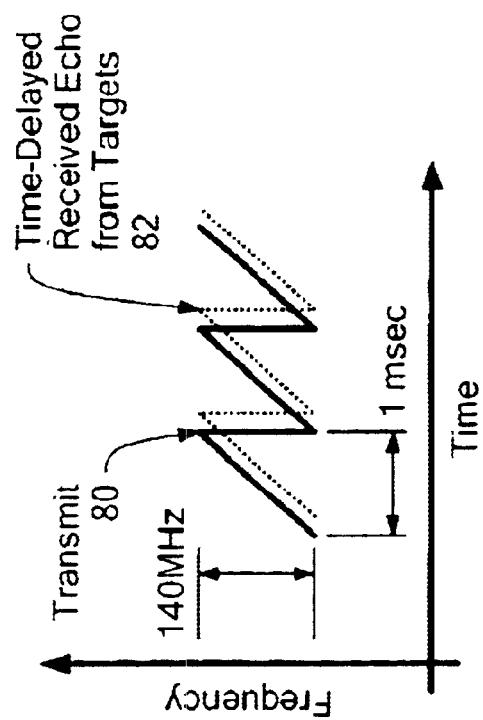
FIG. 5A is a plot of a FMCW chirp signal provided by the BUA system of FIG. 1 and the corresponding echo from an object.

Referring now to FIG. 5A, a FMCW chirp signal 80 is provided by the BUA system 10. In particular the signal is a linear FMCW up chirp waveform, here having a 190 MHz frequency range plus a guard band. A corresponding echo signal 82 from an object in the back-up coverage zone 70 provides a means to detect the object. In order to provide relatively precise resolution of objects in the back-coverage zone 70 (FIGS. 3 and 4) and relatively small minimum range coverage, an additional signal (describe below in conjunction with FIG. 5B) is used alternatively with the chirp signal 80. The FMCW Chirp which is also used with the SODS has a range of approximately one to ten meters. It will be appreciated by those of ordinary skill in the art that other signals such as pseudo-random codes and phase modulated (PM) coded signals can be used to measure the propagation delay from a detected object.

The range to an object in the back-up coverage zone 70 is determined from FFT processing as is known in the art. The selection of which waveform to use is determined by a processor located in the BUA system 10 or a vehicle sensor and the determination is based on a number of factors including but not limited to the location of the closest object in the back-up coverage zone 70, the detection of any objects approaching the vehicle at high speed, and the current operating mode of the vehicle.

Referring now to FIG. 5B, a time domain pulse signal 86 is provided by the BUA. A corresponding return pulse signal (not shown) from an object in the back-up coverage zone 70 provides a means to detect the object. In particular the time domain pulse signal 86 includes a fast rising leading edge 90 having a relatively long total pulse width to minimize the bandwidth of larger spectral components. The range of a detected object is proportional to the measured propagation delay. The time domain pulse signal 86 provides relatively poor resolution of two objects in the sensor field of view but relatively better minimum range performance for the closest object of two or more objects with a precision less than approximately 0.1 m. The time domain pulse signal 86 is used alternatively with the chirp signal 80 to provide more precise measurement for objects which are close to the vehicle's rear bumper. The object's range is determined from the leading edge of the return pulse signal.

In one embodiment, the time domain pulse 86 is repeated at a frequency of approximately 10 to 200 Hz to continuously measure objects near the rear bumper of the vehicle. One of the processors in the BUA system 10 or the NOD system 50 maintains a track file to save the location and range of detected objects.

Figure 6:
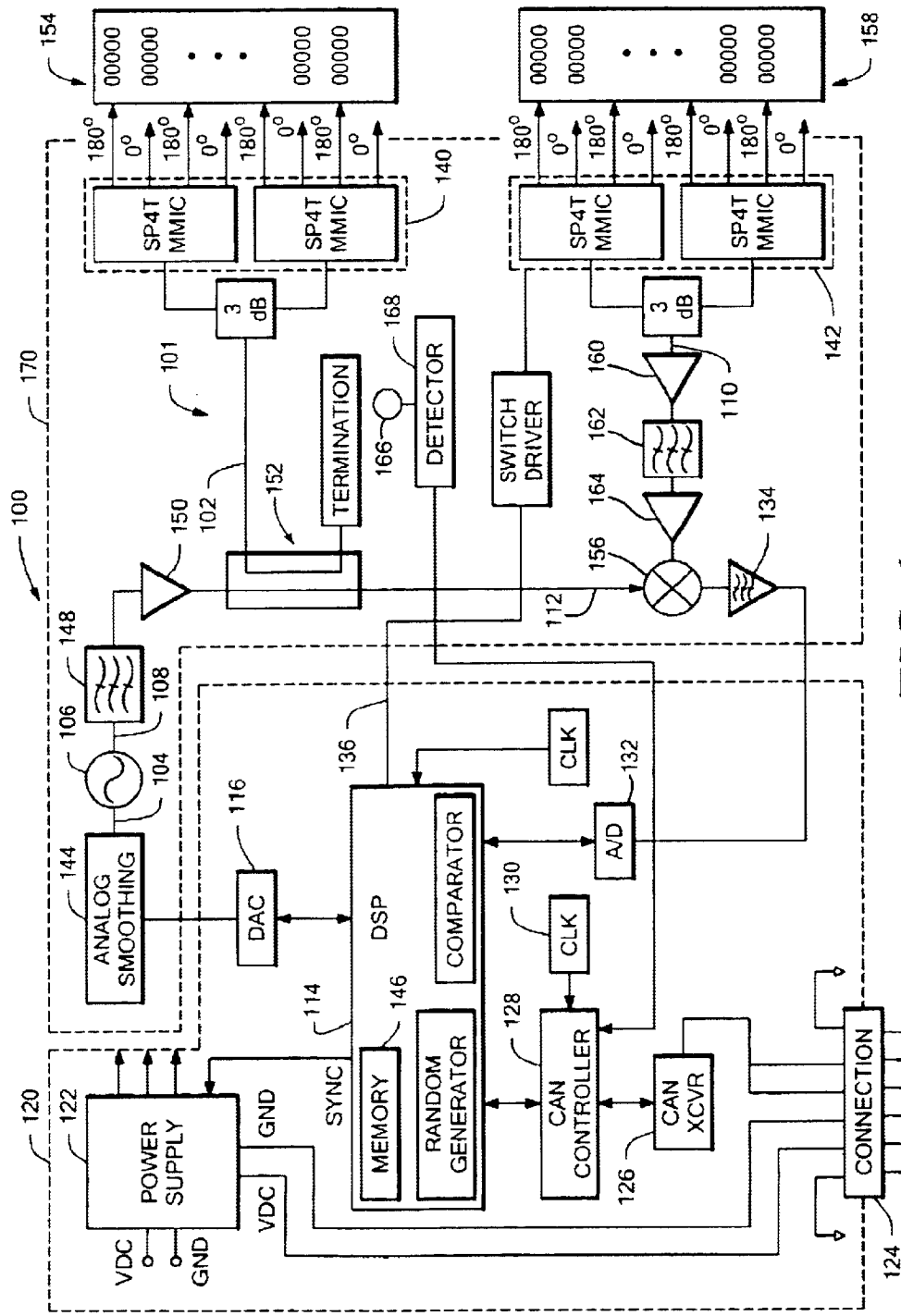
FIG. 6 is a detailed block diagram of a BUA system of the type shown in FIG. 1.

Referring now to FIG. 6, an exemplary radar system 100 which may be similar to the radar systems described above in conjunction with FIGS. 1 and 2 respectively for use as a side object detection (SOD) system and extended for use as a BUA system 10 in an automotive radar application is shown in greater detail. The radar system 10, here the FMCW radar, transmits a transmit signal 102 having a frequency which changes in a predetermined manner over time. The transmit signal 102 is generally provided by feeding a VCO control or ramp signal 104 to a voltage controlled oscillator (VCO) 106. In response to the ramp signal 104, the VCO 106 generates a chirp signal 108.

A measure of transmit time of the RF signal can be determined by comparing the frequency of a return signal 110 (also referred to as a received signal 110) with the frequency of a sample 112 of the transmit signal. The range determination is thus provided by measuring the beat frequency between the frequencies of the sample 112 of the transmit signal and the return signal 110, with the beat frequency being equal to the slope of the ramp signal 104 multiplied by the time delay of the return signal 110.

The measured frequency further contains the Doppler frequency due to the relative velocity between the target and the radar system. In order to permit the two contributions to the measured frequency shift to be separated and identified, a CW tone is generated after the chirp so that the return signal from it differs by the Doppler frequency.

In one embodiment, the VCO control ramp signal 104 is generated with digital circuitry and techniques. In this embodiment, the ramp signal 104 is generated by a DSP 114 and a digital-to-analog converter (DAC) 116. Use of the DSP 114 and DAC 116 to generate the ramp signal 104 is possible in the SOD system of FIG. 6 since, it has been determined that by proper selection of the detection zone characteristics including but not limited to detection zone size, shape and resolution, precise linearity of the chirp signal 108 is not necessary. With this arrangement, the frequency of the transmit signal 102 is accurately and easily controllable which facilitates implementation of several features. As one example, one or more characteristics of successive ramps in the ramp signal 104 are randomly varied in order to reduce interference between similar, proximate radar systems. As another example, temperature compensation is implemented by appropriately adjusting the ramp signal 104. Yet another example is compensation for non-linearity in the VCO operation. Further, changes to the SOD system which would otherwise require hardware changes or adjustments can be made easily, simply by downloading software to the DSP 114. For example, the frequency band of operation of the SOD system can be readily varied, as may be desirable when the SOD is used in different countries with different operating frequency requirements.

An electronics section 120 of the SOD system includes the DSP 114, a power supply 122 and a connector 124 through which signal buses are coupled between the SOD system and a vehicle on which the SOD system is disposed. A digital interface unit is provided in the form of a controller area network (CAN) transceiver (XCVR) 126 which is coupled to the DSP 114 via a CAN microcontroller 128. The CAN controller 128 has a system clock 130 coupled thereto to provide frequency stability. In one embodiment, the system clock is provided as a crystal controlled oscillator. An analog-to-digital (A/D) converter 132 receives the output of a video amplifier 134 and converts the signal to digital form for coupling to the DSP 114 for detection processing. In one embodiment, the A/D converter 132 is provided as a twelve-bit A/D converter. Those of ordinary skill in the art will appreciate, however, that any A/D converter having sufficient resolution for the particular application may be used. A signal bus 136 is coupled to antenna switch circuits 140, 142 in order to provide control signals to drive the switches which comprise the switch circuits. Also provided in the electronics section 120 of the SOD system is a memory in which software instructions, or code and data are stored. In the illustrative embodiment of FIG. 6, the memory is provided as a flash memory.

The DSP 114 provides output signals, or words to the DAC 116 which converts the DSP output words into respective analog signals. An analog smoothing circuit 144 is coupled to the output of the DAC 116 in order to smooth the stepped DAC output to provide the ramp control signal to the VCO 106. The DSP 114 includes a memory device 146 in which is stored a look-up table containing a set of DSP output signals, or words in association with the frequency of the transmit signal generated by the respective DSP output signal.

The VCO 106 receives ramp signal 104 from the analog smoothing circuit 144. In one embodiment, the VCO operates in the transmit frequency range of between 24.05 to 24.25 GHz and provides an output signal to bandpass filter 148, as shown.

The output of the VCO 106 is filtered by the bandpass filter 148 and amplified by an amplifier 150. A portion of the output signal from amplifier 150, is coupled via coupler 152 to provide the transmit signal 102 to a transmit antenna 154. Another portion of the output signal from the amplifier 150 corresponds to a local oscillator (LO) signal fed to an LO input port of a mixer 156 in the receive signal path.

The switch circuits 140, 142 are coupled to the transmit and receive antennas 154, 158 through a Butler matrix (not shown in FIG. 6). The antennas 154, 158 and switch circuits 140, 142, and Butler matrix can be of the type described in co-pending U.S. Patent Application entitled Slot Antenna Element for an Array Antenna and Switched Beam Antenna Architecture, application Ser. No. 09/931,633, filed on Aug. 16, 2001, and incorporated herein by reference in its entirety. Suffice it here to say that the switch circuits and Butler matrix operate to provide the antenna having a switched antenna beam with antenna beam characteristics which enhance the ability of the SOD system to detect targets.

The return signal 110 is processed by an RF low noise amplifier (LNA) 160, a bandpass filter 162, and another low noise amplifier (LNA) 164, as shown. The output signal of the LNA 164 is down-converted by mixer 156 which receives the local oscillator signal coupled from the transmitter, as shown. Illustrative frequencies for the RF signals from the LNA 164 and the local oscillator signal are on the order of 24 GHz. Although the illustrated receiver is a direct conversion, homodyne receiver, other receiver topologies may be used in the SOD radar system.

The video amplifier 134 amplifies and filters the down-converted signals which, in the illustrative embodiment have a frequency between 1 KHz and 40 KHz. The video amplifier may incorporate features, including temperature compensation, filtering of leakage signals, and sensitivity control based on frequency, as described in a co-pending U.S. Patent Application entitled Video Amplifier for a Radar Receiver, application Ser. No. 09/931,593, filed on Aug. 16, 2001, and incorporated herein by reference in its entirety.

The A/D converter 132 converts the analog output of the video amplifier 134 into digital signal samples for further processing. In particular, the digital signal samples are processed by a fast Fourier transform (FFT) within the DSP in order to determine the content of the return signal within various frequency ranges (i.e., frequency bins). The FFT outputs serve as data for the rest of the signal processor 114 in which one or more algorithms are implemented to detect objects within the field of view, as described in co-pending U.S. Patent Application entitled Radar Transmitter Circuitry and Techniques, application Ser. No. 09/931,636, filed on Aug. 16, 2001, and incorporated herein by reference in its entirety.

The radar system may include a temperature compensation feature with which temperature induced variations in the frequency of the transmit signal are compensated by adjusting the ramp signal accordingly. For this purpose, the transmitter 101 includes a dielectric resonator 166 coupled to a microwave signal detector 168. The output of the microwave detector is coupled to an analog-to-digital converter of the CAN controller 128 for processing by the DSP 114. The details of such processing are described in the aforementioned U.S. patent application Ser. No. 09/931,636 entitled Radar Transmitter Circuitry and Techniques.

In one embodiment, the apertures of the transmit and receive antennas 154, 158 are formed on a surface of a low temperature, co-fired ceramic (LTCC) substrate (not shown). The RF circuit components which provide the RF transmitter and receiver components denoted 170 are included either within or on the LTCC substrate.

The VCO 106 is provided as a surface mount component disposed on a surface of the LTCC substrate. Similarly amplifiers 150, 160, 164 and mixer 156 may be provided as monolithic microwave integrated circuits (MMICs) and disposed on a surface of the LTCC substrate.

Similarly, those components which comprise electronics section 120 are disposed on a printed circuit board (not shown). For example, DSP 114, DAC 116, power supply 122, LAN XCVR and controller 126, 128 and A/D 132 are all disposed on first or second surfaces of the printed circuit board. In this manner, the BUA system 10 is provided as an entire radar system in a compact package.

Figure 6A:
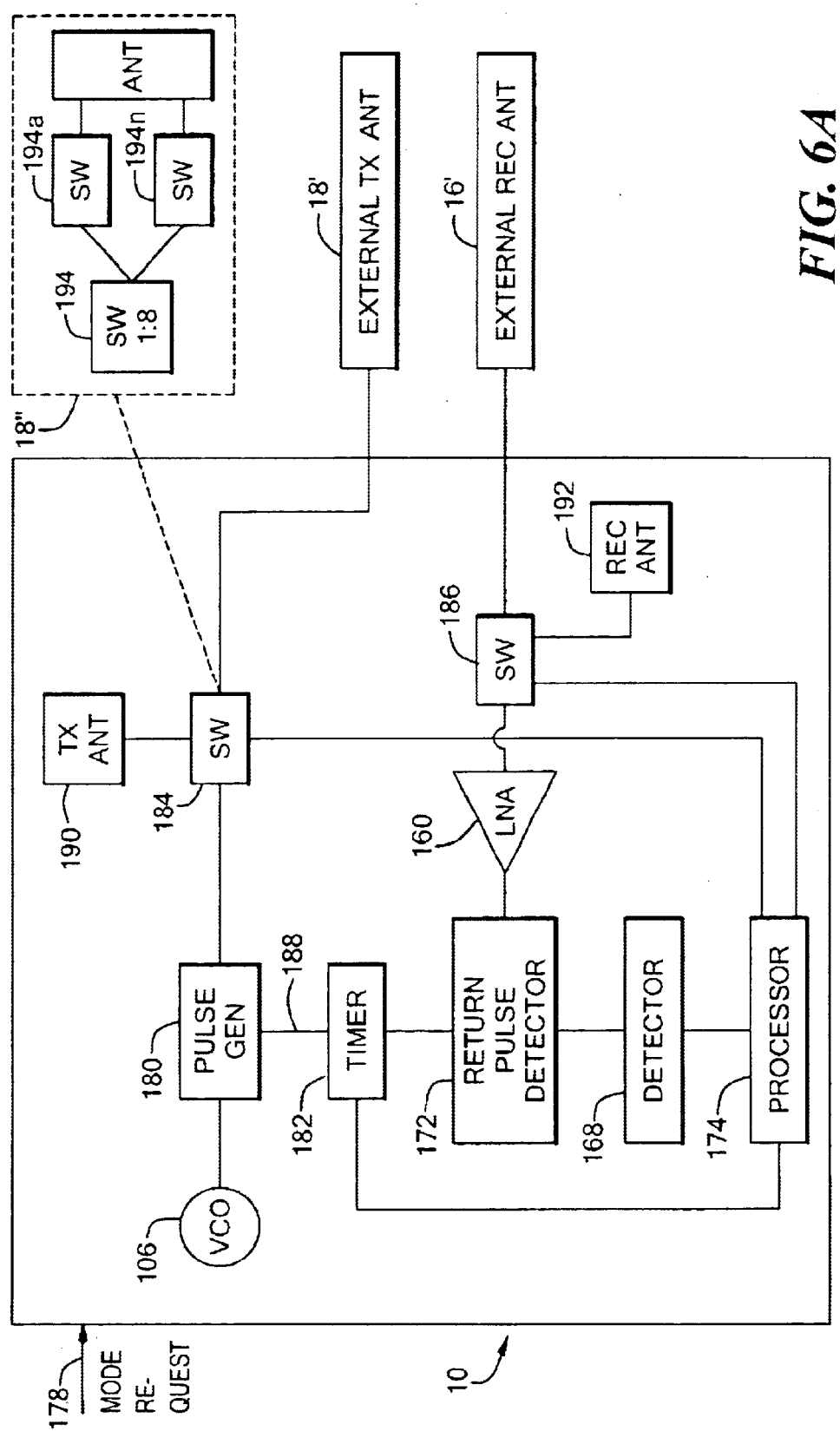
FIG. 6A is a block diagram of the waveform generation circuit and antenna switching circuit of the BUA system of the type shown in FIG. 1.

Referring now to FIG. 6A, in which like reference numbers indicate like elements in FIG. 6, the BUA system 10 includes additional components such as an external receive antenna 16' and an external transmit antenna 18'. The BUA system 10 further includes a mode selection input 178, a timer circuit 182 and a pulse waveform generator 180 coupled to the CW RF signal source VCO 106. The timer circuit 182 is coupled to a return pulse detector 172. The pulse waveform generator 180 can be included in the circuit of FIG. 6 at a connection shown as signal 108 or signal 102.

The pulse waveform generator 180 includes a timer input 188 coupled to the timer circuit 182. An output of the pulse waveform generator 180 is coupled to an input of a switch 184. The switch 184 has a first output coupled to an internal transmit antenna 18 and a second output coupled to an external transmit antenna 18'.

The receive circuit includes an additional switch 186 having input ports coupled to the internal receive antenna 16 and the external receive antenna 16' respectively. The output port of the switch is coupled to the input of the RF low noise amplifier (LNA) 160 (FIG. 6). The timer circuit 182 is coupled to the BUA processor, for example a DSP to provide a range measurement. The RF low noise amplifier (LNA) 160 output is fed to the detector 172 coupled to the timer circuit 182 to detect and measure the return pulse 90 (FIG. 5B).

In one embodiment, the pulse waveform generator 180 is for example a high speed switch. In operation, a mode request is supplied via the mode selection input 178 to the processor to select whether the sensor is operating in a SOD mode, BUA mode, or another mode. In the BUA mode the output of switches 184 and 186 are coupled to the external antennas 16' and 18'. The pulse waveform generator 180 selectively provides a time domain pulse signal controlled by timer circuit 182 or the FMCW chirp signal 80 to switch 184 which is selective coupled to the transmit antenna 18 or 18'. The timer circuit 182 supplies an input to the waveform generator 180 which provides a series of switching pulses having relatively fast rise time and a slow decay. The pulse waveform generator 180 alternately provides either the chirp signal 80 or the time domain pulse signal 86 as described above in conjunction with FIGS. 5A and 5B. In one embodiment, when the time domain pulses are provided, the chirp signal 80 is disabled so that a pure CW tone signal is provided to the pulse waveform generator 180. Alternatively some form of frequency modulation may still be retained which allows detection in the time domain. Changing from chirp generation to pulse generation is accomplished, for example, by putting the chirp generator into a CW tone state, switching the transmitted CW tone on and off under timer circuit 182 control to form the pulse with required rise and fall times. The chirp generator is placed into a CW tone state, for example by providing a constant output from the DAC 116 or disabling the VCO 106. Thus, in the BUA mode the BUA system 10 uses both the FMCW chirp signal 80 and the time domain pulse signal 86 coupled to the external transmit antenna 18' and the return signal is received on the external receive antenna 16' and the external antennas 16' and 18' are disposed on the back bumper. In the SOD mode the system uses a FMCW chirp signal 80 coupled to the internal transmit antenna 18 and the return signal is received on the internal receive antenna 16. Modes can be switched automatically or set manually by the vehicle operator. For example, when the vehicle is operating in reverse at slow speed, the system can switch to BUA mode.

The BUA system 10 can further include an alternative transmit antenna 18" (and corresponding receive antenna (not shown)) which includes active switching at the antenna to reduce the number of RF cables which are connected to the antenna when a number of subarrays are used. In this embodiment, a plurality of logic cables is coupled to the switches 194a–194n to control the antenna subarrays. If a larger number of subarrays are used better zone definition and range precision and accuracy can be obtained, but having increased complexity. After detecting an object the BUA system can select specific subarray to transmit and receive signals as a function of the last known location and range of the object in the back-up coverage zone 76. In general the closest object is most important, but the system can handle exceptions such as fast moving objects entering the back-up coverage zone 76. In one embodiment, the alternative transmit antenna 18" can include a butler matrix to provide further switching capability.

When an object is detected, the BUA system 10 provides an indication to the operator of the vehicle. The indication can be provided as an audible tone, an LED indicator, an image displayed in a heads-up display or in a vehicle mirror having a display capability.

Figure 7:
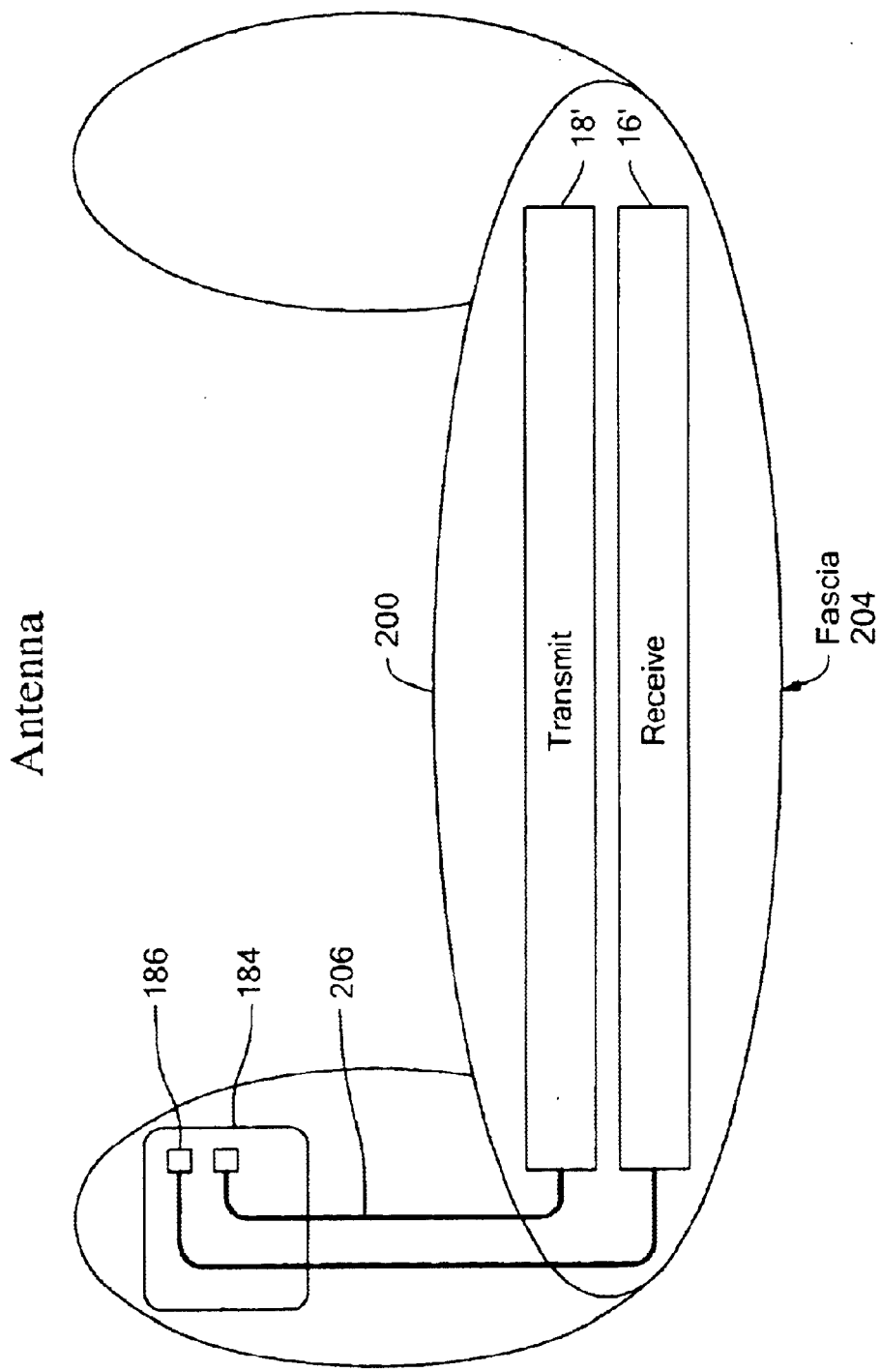
FIG. 7 is a schematic diagram of external transmit and receive antennas of the BUA system of FIG. 1.

Referring now to FIG. 7, an external antenna assembly 200 (also referred to as a bumper antenna assembly 200) is mounted on the fascia 204 of a bumper and includes transmit antenna 18' and receive antenna 16'. The antenna assembly 200 is coupled to the switch 184 and switch 186 (FIG. 6A) by a plurality of cables 206. The cables 206 can carry either RF signal or logic signals to control antenna subarrays. The antenna assembly 200 is mounted on the fascia 204 of the rear bumper, or optionally disposed within the rear bumper or mounted elsewhere the rear of vehicle.

Referring now to FIGS. 8A–8C, an antenna radiation pattern is provided by multiple sources 224a–224j which are used in conjunction with the BUA system 10. Various near-field and far-field beam patterns are formed by combining all or subsets of the adjacent sources 224a–224j. For example, combining adjacent sources 224a–224j in a left and right halves, 224a–224e and 224f–224j respectively, provides beams 226a and 226b as illustrated in FIG. 8B.

FIG. 8A shows a plot of antenna system beams provided by combining predetermined ones of the external antenna elements and the resulting detection zone which can be provided by the BUA system 10 having a single full-width aperture operating in the near field. FIG. 8B shows a single full-width aperture split into right and left halves operating in the near field.

FIG. 8B is a plot of external antenna system beams provided by combining predetermined ones of the external antenna elements and the resulting detection zone which can be provided by the BUA system of FIG. 1. The resultant combined beam array factor is shown. The combined beams 226a and 226b approximately cover the back-up area in azimuth with an approximately twenty degree beam dispersion in elevation. A taper illumination on the sources using an aperture taper weighting provides a quasi-collimated beam in the near field. As a result an exemplary back-up coverage zone 70' zone is provided.

The amount of signal energy used by back-up systems is limited in spectral extent in some jurisdictions by governmental regulation. Because the BUA system 10 is operating at short ranges it is not feasible to turn on and turn off the transmitted signal quickly enough using a gated receiver. Therefore sufficient isolation is required between the receive antenna 16' and the transmit antenna 18'. Isolation is achieved by physical separation of the external receive antenna 16' and external transmit antenna 18'. The chirp signal 80 has a narrow bandwidth but the pulse signal 86 requires a relatively wide bandwidth. By operating in the near field, the BUA system 10 and the bumper antenna assembly 200 provide a quasi-collimated beam having the desired rectilinear radiation pattern. This radiation pattern assures that the energy is delivered on target and a sufficient return signal will be provided. The back-up coverage zone 70 is provided having a rectilinear shape. The manner in which an object is detected is described in the above referenced co-pending U.S. Pat. application Ser. No. 09/931, 631.

The exemplary BUA system 10 of FIGS. 8A and 8B, has ten antenna element adjacent sources 224a–224j. It will be recognized by one of ordinary skill in the art that other numbers of beams (e.g. fewer or more than ten) and having a range of scan angles are possible without departing from the present invention. The particular number of antenna elements used in a particular application is selected in accordance with a variety of factors including but not limited to shape of coverage zone, size of coverage zone, required Azimuth resolution, complexity and cost.

FIG. 8C shows a far field pattern provided by combining predetermined ones of the external antenna elements and the resulting detection zone 71.

Figure 9:
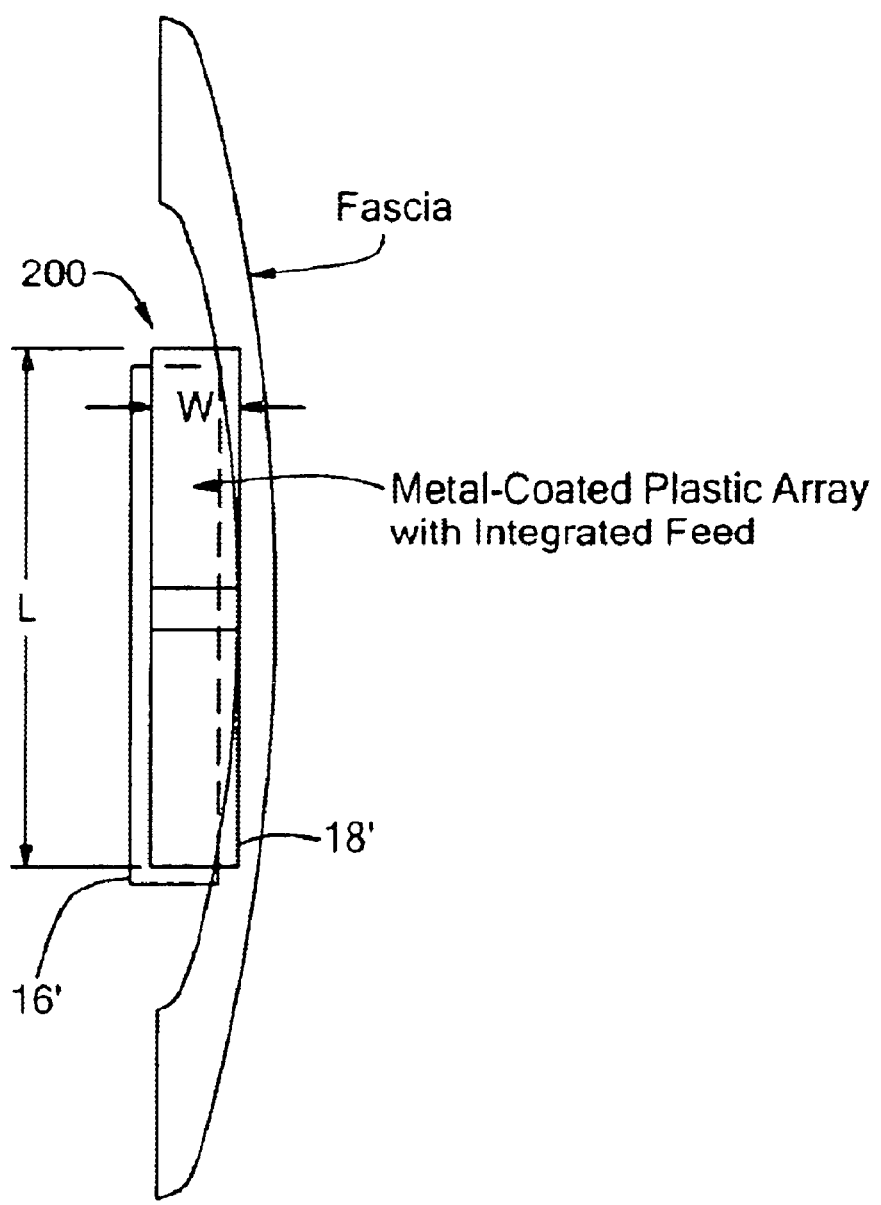
FIG. 9 is a cross-sectional top view of the external transmit and receive antennas mounted on a vehicle bumper.

Referring now to FIG. 9, the bumper antenna assembly 200 (FIG. 8A) having a length L and width W includes the external transmit antenna 18' (FIG. 1) and the external receive antenna 16'. In one embodiment, the bumper antenna assembly 200 includes a metalized plastic structure across the bumper fascia and the width is approximately ten cm and the length is approximately two meters (described in further detail in conjunction with FIGS. 10 and 11).

In another embodiment the bumper antenna assembly 200 includes the external transmit antenna 18' and the external receive antenna 16' as passive arrays, having no active components. The external transmit antenna 18' and the external receive antenna 16 of the bumper antenna assembly 200 are resilient to impact and provide a waveform to cover back-up coverage zone 70 and can be connected to the master electronics and RF controlled with as few as two RF cables. The external antennas 16' and 18' are designed with an illumination taper (in both amplitude and phase) resulting in a wave which is relatively narrow in elevation and wider in azimuth to further result in an antenna pattern which optimally covers the desired back-up coverage zone 70 (referred to as zone coverage characteristics).

Figure 10:
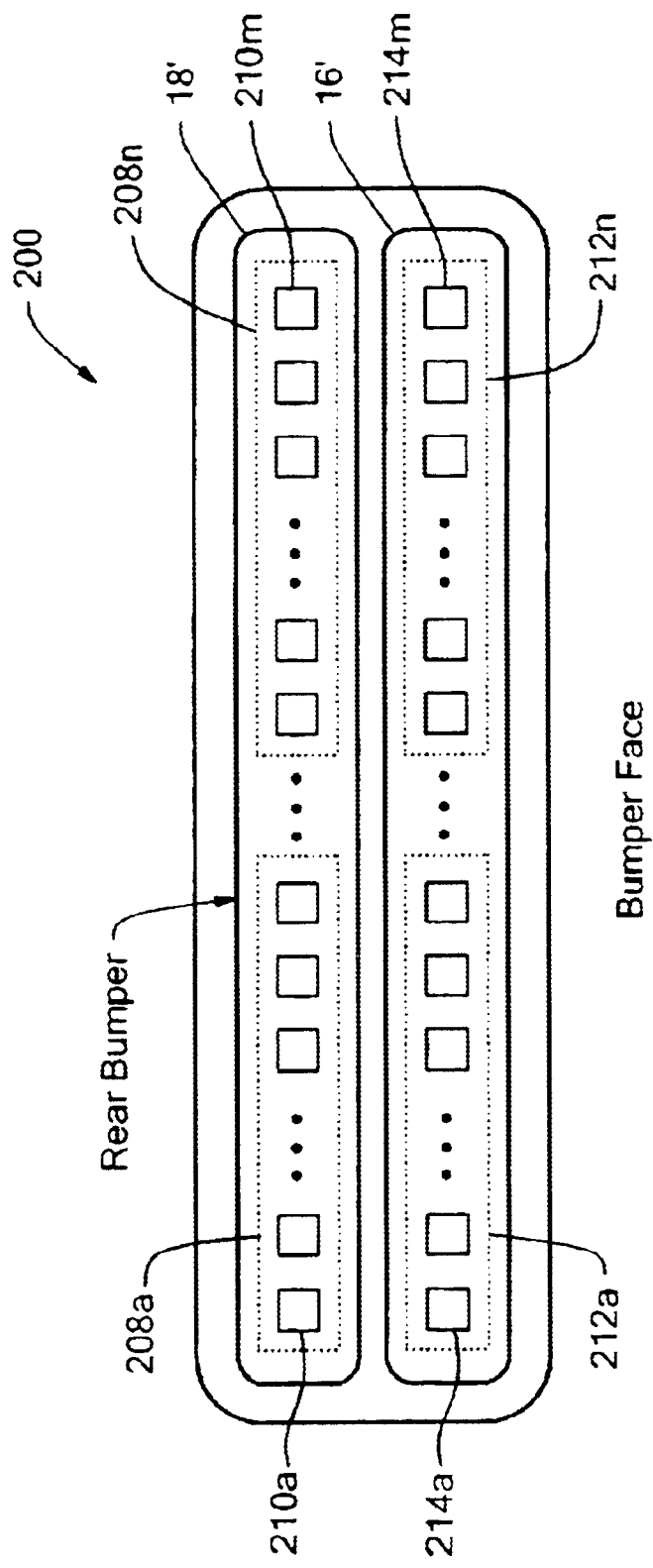
FIG. 10 is a cross-sectional side view of the external transmit and receive antennas mounted on a vehicle bumper.

Referring now to FIG. 10, in which like elements of FIG. 9 are provided having like reference designations, the external transmit antenna 18' includes a plurality of antenna transmit subarrays 208a–208n (generally referred to as transmit subarrays 208) having elements 210a–210m and the external receive antenna 16' includes a plurality of antenna receive subarrays 212a–212n (generally referred to as receive subarrays 212) having elements 214a–214m.

In one particular embodiment the external antenna receive subarrays 212 and transmit subarrays 208 and are provided by a flexible waveguide comprising injection molded plastic having a metallic coating. The bumper antenna assembly 200 is designed to minimize gaps in the coverage area near the fascia. Objects in these gaps are often missed by conventional point sensors. In this embodiment, waveguide elements feed the RF signal with the appropriate phase and amplitude to form beam to cover back-up coverage zone 70. The bumper antenna assembly 200 can be viewed as providing multiple Huygen sources providing a wave front parallel to the bumper face, propagating out in range in order to take advantage of near-field characteristics of antenna.

The bumper antenna assembly 200 is provided as a relatively low cost plastic antenna, in two alternate embodiments. In a first embodiment, an injection molded waveguide network, plastic with metallic coating inside is provided. In a second embodiment, a stripline circuit printed on adhesive plastic tape is provided, with a back side having a metalized ground plane and front side having a plurality of patch radiators.

The bumper antenna assembly 200 can, for example, include thirty-two wideband radiators in M- subarrays (M=e.g. 1–8) with taper illumination and predetermined polarization. In one embodiment, the bumper antenna assembly 200 includes four subarrays each having eight wideband radiators. The bumper antenna assembly 200 can include corporate in-phase wideband waveguide feed network, magic tees having load ports terminated in an absorptive stick-on termination or reactive termination, and cable-to-probe connector interfaces. In addition, the transmit and receive apertures are separated physically.

Figure 11:
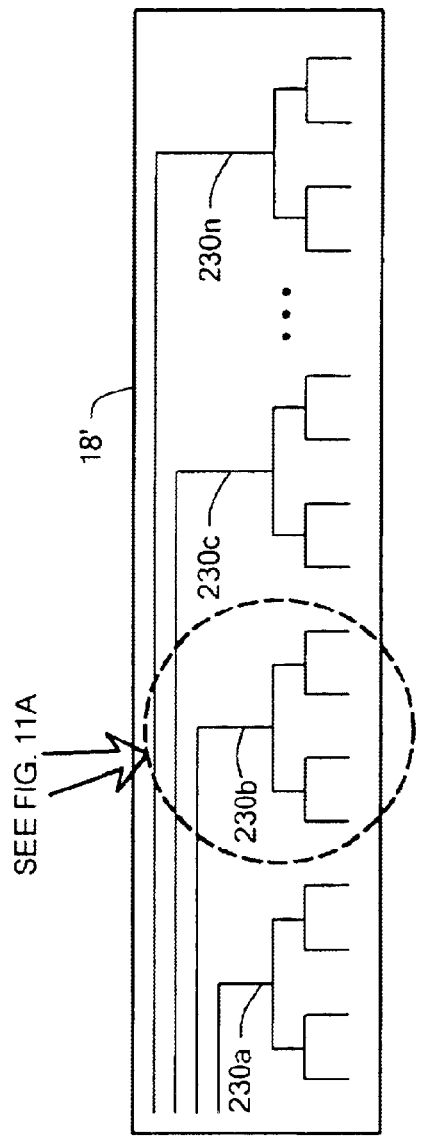
FIG. 11 is an exploded cross-sectional view of the external transmit antenna elements of FIG. 10.

Referring now to FIG. 11 in which like elements of FIG. 10 are provided having like reference designations, the transmit antenna 18' includes a plurality of waveguide subarrays 230a–230n and associated feed circuits.

Figure 11A:
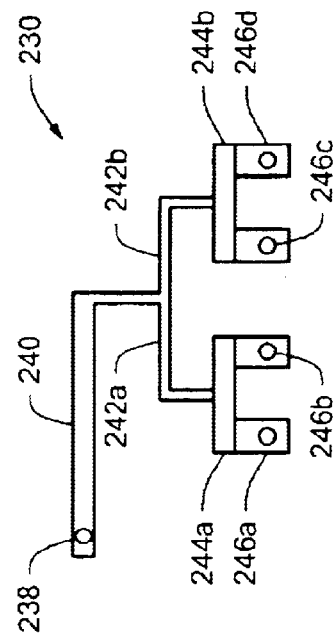
FIG. 11A is an exploded cross-sectional view of a waveguide subarray of FIG. 11.

Referring now to FIG. 11A, the waveguide subarray of FIG. 11 includes a feed 238 (described in more detail in conjunction with FIG. 12) coupled to a first channel 240. The first channel is coupled to second level channels 242a and 242b which split the signal received from channel 240. Channels 242a and 242b feed the signal to channels 244a and 244b which feed the signals to waveguide outputs 246a–246d respectively. It will be appreciated by those of ordinary skill in the art the number of channels and radiating elements can be varied to match a particular antenna design and coverage area.

In one embodiment, the bumper antenna assembly 200 includes a plastic, injection-molded, slightly flexible structure which is resilient to normal impacts on the vehicle's bumper. The structure is metalized, at least on internal faces of waveguide to minimize RF insertion loss and to minimize undesirable RF leakage out of structure. The antenna includes closed-cell low-density low-loss foam which is injected to fill the waveguide channels to preserve the low loss characteristics of the waveguide channels under varying environmental conditions. The foam prevents moisture build-up with temperature cycling and prevents dirt particle intrusion into the waveguides. The bumper antenna assembly 200 is attached using a no-gap adhesive attachment to the back face of bumper fascia maintaining a stable microwave match through the fascia to minimize RF leakage between transmit and receive antennas.

In an alternative embodiment, the bumper antenna assembly (not shown) includes a plastic, multilayer tape, which is slightly flexible providing a low cost complex structure resilient to normal hits to bumper. The bumper antenna assembly includes a metalized ground plane on the back layer, a middle layer includes a printed or rolled transmission lines, and the front layer includes a plurality of patch or slot radiators towards fascia. The antenna assembly 200' is attached to the back face of the bumper fascia with no-gap and an adhesive to maintain a stable microwave match through the fascia, minimize RF leakage between transmit and receive antennas, the includes a capacitive or direct-contact connection of RF feed cables.

Referring now to FIG. 12 a portion of the waveguide subarray 230 is coupled to the RF module by a coax probe 270 which is connected to the external transmit antenna 18'. The coax probe 270 is mechanically fastened to the waveguide subarray 230 with a clip mechanism 264. The waveguide subarray 230 includes an upper cover 262 disposed on a plurality of waveguide channels 272a–272n and the cover 262 is disposed between the clip mechanism 264 and the waveguide channel 272b with the coax probe 270 disposed in an aperture (not shown) in the cover 262. The cover 262 is disposed on a housing 266, here formed from plastic. The housing 266 includes metalized inner surfaces 268 and non-metal surfaces 274 which form the waveguide channels 272.

FIGS. 12A, 12B and 12C illustrate different arrangements of the coax probe 270. Referring now to FIG. 12A, the coax probe 270 includes a center conductor around which is disposed an outer shield. The end of the coax probe 270 which is inserted into the waveguide channel 272 has a portion of an outer shield 282 removed exposing a portion of a coax probe dielectric 284. Referring now to FIG. 12B, the coax probe 270' is similar to coax probe 270 but a portion of an end of the coax probe 270' which is inserted into the waveguide channel 272 has a portion of both the outer shield 282 and a portion of the coax probe dielectric 284 removed exposing a portion of the center conductor 280. Referring now to FIG. 12C, the coax probe 270" is similar to coax probe 270 but a portion near an end of the coax probe 270"

which is inserted into the waveguide channel 272 has a portion of both the outer shield 282 and a portion of the coax probe dielectric 284 removed exposing a portion 286 of the center conductor 280 and a second portion of an end of the coax probe 270" which is inserted into the waveguide 272 has a portion of both the outer shield 282 and a portion of the coax probe dielectric 284 removed with a portion 288 of the probe dielectric 284 remaining.

Figure 13:
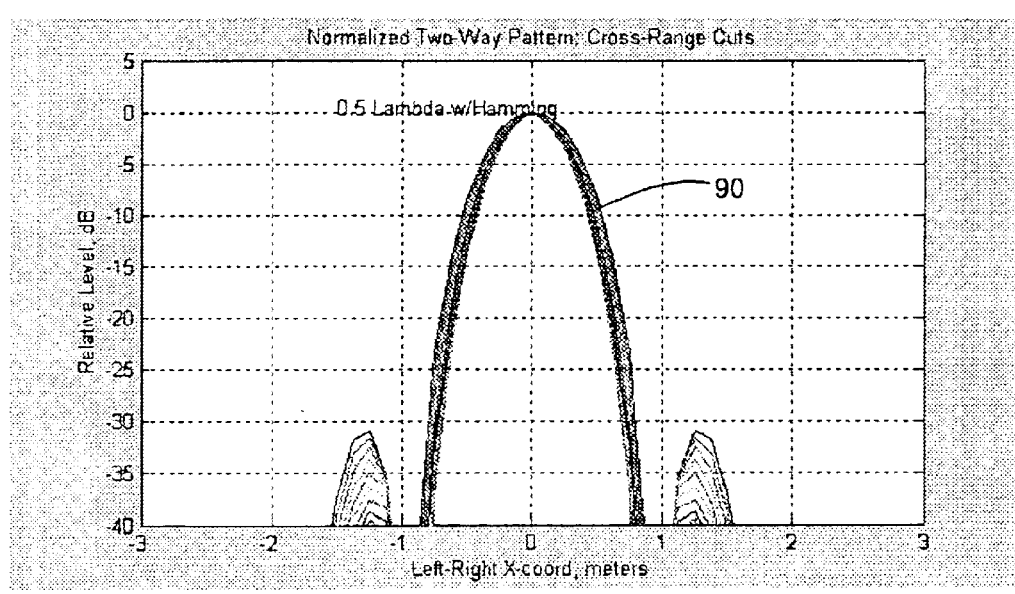
FIGS. 13–14 are plots of prior art uncollimated back-up area coverage beams.
Figure 14:
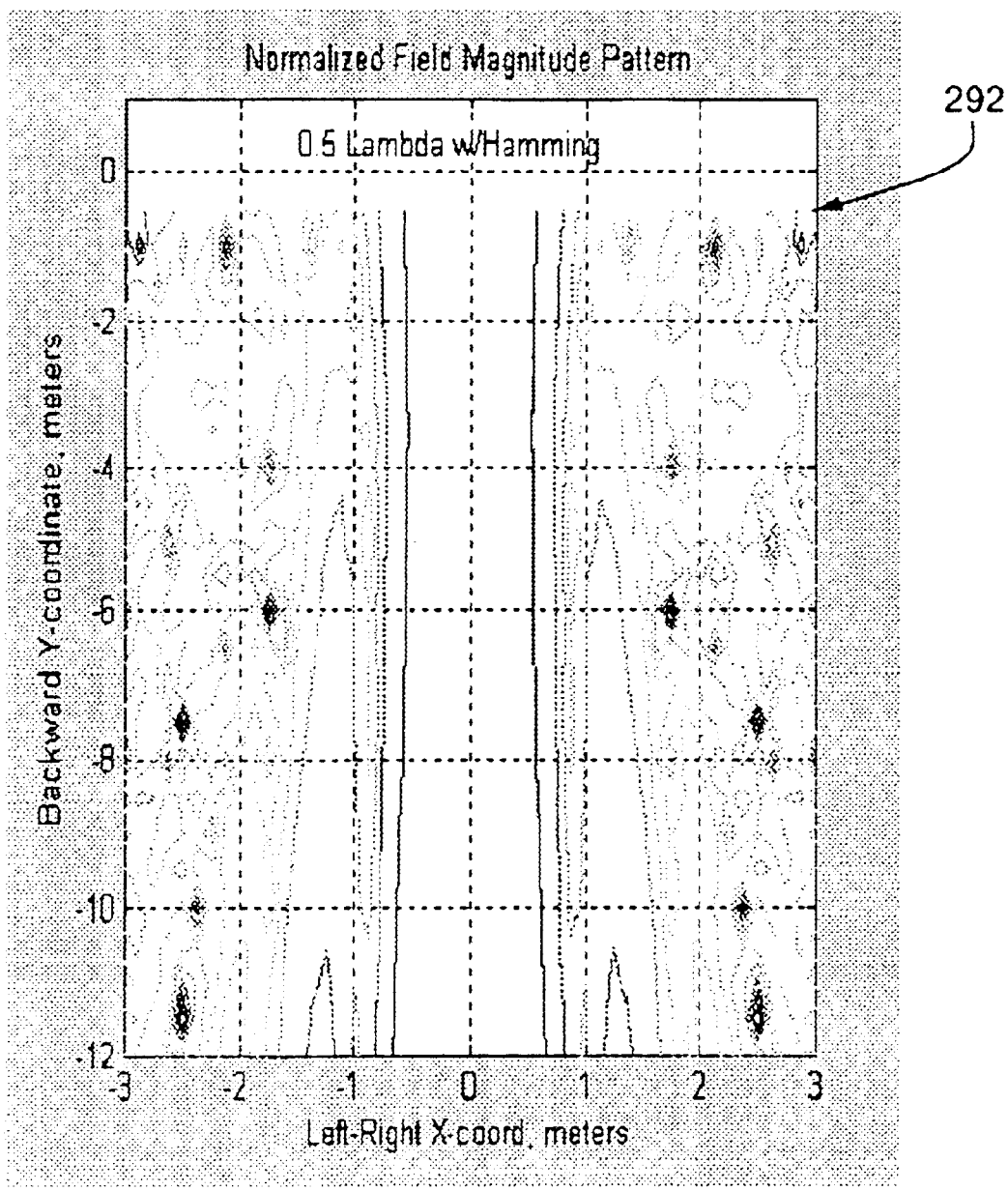

Now referring to FIGS. 13 and 14, the prior art beam pattern 290 and back-up coverage area pattern 292 are shown. Prior art systems conventionally use characteristics principally in the far-field:

in a range>$2D^2/\lambda$, where: D is physical extent of antenna aperture; and $\lambda$ is the operating RF wavelength.

A conventional wide aperture provides narrow beams in far field, highly tapered aperture illumination for low sidelobe levels, while suffering from missed coverage at outer portions of aperture in near range. In addition the narrow beams are not well formed close to the antenna aperture.

When an object is a large distance from an array compared to the width of the array 224a–224j (FIG. 8A), the ranges from each individual element 224a–224j to the object are all approximately the same, the element ratios being approximately unity. As the object approaches the array, a range is reached at which the range from the object to some of the elements (e.g., 224e and 224f) is much less than to other elements further to the right and left (e.g., 224j and 224a). This means that an array having output that is proportional to the range from each element to the object will report not a single range for that object but a spread in ranges. This effect of this spread in ranges is mitigated by the range factor weighting that inherently occurs as an object approaches the array elements. The range factor weighting is inversely proportional to the range from an element to the object. The further a particular element is from the object, the smaller in magnitude is its response to the object. Conversely the elements closest to the object have the largest responses in magnitude. The summed response of the array is thus weighted by range factor towards the responses from those elements to which the object is closest. For example, an FMCW radar measures range as proportional to the beat frequency between a transmitted chirp signal and the echo received through the array from an object in its field of view. The greater the range the higher in frequency is the beat frequency.

Table 1 shows an example of the spreading in beat frequency caused by the ranges to individual element in an array of 32 elements. The conversion from frequency to range is approximately 0.83 meters per kilohertz in the example of Table 1. Thus a frequency of 12.6 kHz corresponds to a range measurement of 10.5 meters, and 0.6 kHz corresponds to 0.5 meters.

TABLE 1

R (meters from fascia) =

| −10.5 | −8.5 | −6.5 | −4.5 | −2.5 | −0.5 |
|---|---|---|---|---|---|
| Freq (KHz) = | | | | | |
| 12.6535 | 10.2660 | 7.8862 | 5.5237 | 3.2174 | 1.3082 |
| 12.6468 | 10.2578 | 7.8754 | 5.5084 | 3.1910 | 1.2420 |
| 12.6406 | 10.2501 | 7.8654 | 5.4941 | 3.1663 | 1.1769 |
| 12.6348 | 10.2430 | 7.8561 | 5.4808 | 3.1431 | 1.1131 |
| 12.6295 | 10.2364 | 7.8475 | 5.4684 | 3.1215 | 1.0507 |
| 12.6246 | 10.2304 | 7.8397 | 5.4571 | 3.1016 | 0.9900 |
| 12.6201 | 10.2249 | 7.8325 | 5.4468 | 3.0834 | 0.9315 |
| 12.6161 | 10.2199 | 7.8260 | 5.4375 | 3.0670 | 0.8754 |
| 12.6125 | 10.2155 | 7.8203 | 5.4292 | 3.0523 | 0.8224 |
| 12.6094 | 10.2116 | 7.8152 | 5.4220 | 3.0394 | 0.7731 |
| 12.6068 | 10.2083 | 7.8109 | 5.4157 | 3.0282 | 0.7281 |
| 12.6045 | 10.2056 | 7.8073 | 5.4105 | 3.0189 | 0.6884 |
| 12.6027 | 10.2034 | 7.8044 | 5.4064 | 3.0115 | 0.6549 |
| 12.6014 | 10.2017 | 7.8023 | 5.4033 | 3.0059 | 0.6286 |
| 12.6005 | 10.2006 | 7.8008 | 5.4012 | 3.0021 | 0.6105 |
| 12.6001 | 10.2001 | 7.8001 | 5.4001 | 3.0002 | 0.6012 |
| 12.6001 | 10.2001 | 7.8001 | 5.4001 | 3.0002 | 0.6012 |
| 12.6005 | 10.2006 | 7.8008 | 5.4012 | 3.0021 | 0.6105 |
| 12.6014 | 10.2017 | 7.8023 | 5.4033 | 3.0059 | 0.6286 |
| 12.6027 | 10.2034 | 7.8044 | 5.4064 | 3.0115 | 0.6549 |
| 12.6045 | 10.2056 | 7.8073 | 5.4105 | 3.0189 | 0.6884 |
| 12.6068 | 10.2083 | 7.8109 | 5.4157 | 3.0282 | 0.7281 |
| 12.6094 | 10.2116 | 7.8152 | 5.4220 | 3.0394 | 0.7731 |
| 12.6125 | 10.2155 | 7.8203 | 5.4292 | 3.0523 | 0.8224 |
| 12.6161 | 10.2199 | 7.8260 | 5.4375 | 3.0670 | 0.8754 |
| 12.6201 | 10.2249 | 7.8325 | 5.4468 | 3.0834 | 0.9315 |
| 12.6246 | 10.2304 | 7.8397 | 5.4571 | 3.1016 | 0.9900 |
| 12.6295 | 10.2364 | 7.8475 | 5.4684 | 3.1215 | 1.0507 |
| 12.6348 | 10.2430 | 7.8561 | 5.4808 | 3.1431 | 1.1131 |
| 12.6406 | 10.2501 | 7.8654 | 5.4941 | 3.1663 | 1.1769 |
| 12.6468 | 10.2578 | 7.8754 | 5.5084 | 3.1910 | 1.2420 |
| 12.6535 | 10.2660 | 7.8862 | 5.5237 | 3.2174 | 1.3082 |

Table 1 illustrates the unweighted frequency spread vs. range to the object, from using FMCW chirped waveform. As seen in Table 1, as an object nears the aperture, the path lengths from the object to the elements vary over larger intervals, and consequently the frequency spread increases. The range provided by an FMCW chirp radar is proportional to the frequency of the summed signal. The summed signal then is the sum of n signals with varying frequency. Fortunately, the largest term in the sum is the term with lowest frequency due to range factor weighting. Therefore, the reported range is the closest range. So despite frequency spreading due to the wide physical extent of the array at near range with respect to true range to object, the reported range is weighted to the object closest in range.

By providing the aperture taper weighting to produce a quasi-collimated antenna pattern in the near field, the antenna pattern in the near field has zone coverage characteristics. The antenna pattern includes summed wavefronts formed substantially parallel to the aperture in near field. The resulting aperture taper is smaller, balanced between collimation and sidelobe levels (SLLs) and the resulting field pattern has substantially parallel-edged beams extending out from the aperture. This pattern better approximates the rectilinear shape of desired coverage zone where the beam is formed close to the antenna aperture in this desired shape and coverage extends to the full width of the aperture. The zone coverage characteristics are a tradeoff between several characteristics including azimuth coverage, sidelobe levels, and ripple across the main lobe.

Figure 15:
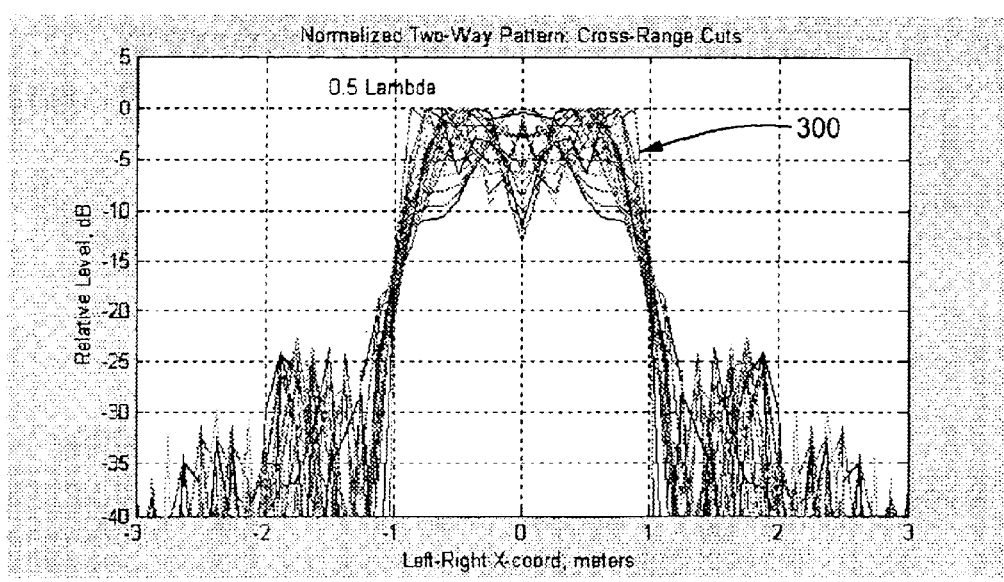
FIGS. 15–22 are plots of quasi-collimated back-up area coverage beams according to the present invention.
Figure 16:
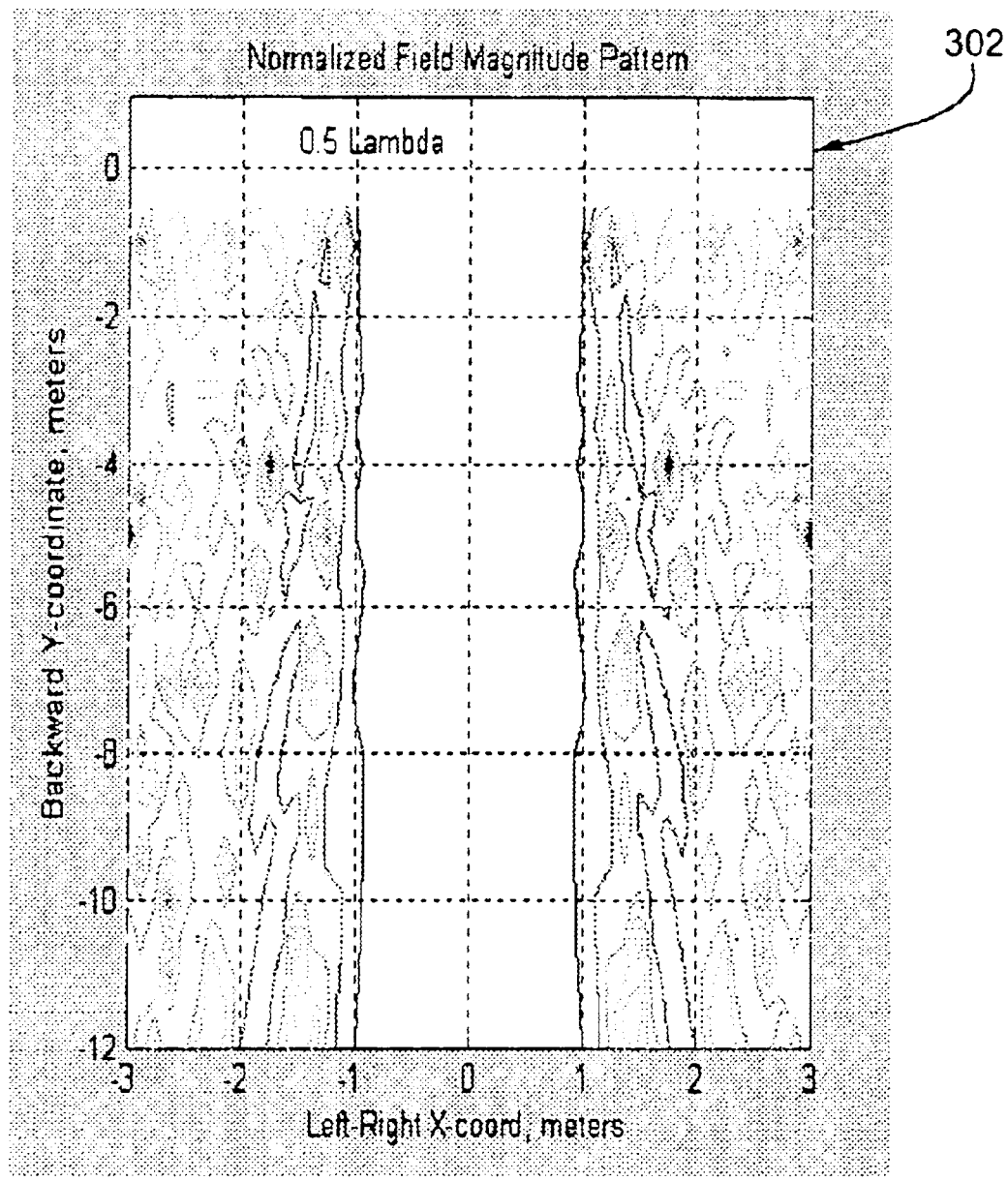

Now referring to FIGS. 15–22, several examples of a quasi-collimated antenna pattern are shown. FIG. 15 shows the cross-range antenna pattern 300 at various ranges of a first exemplary quasi-collimated array. FIG. 16 shows a contour plot of the field pattern 302 corresponding to the cross-range cuts of FIG. 15. In this first example, the antenna elements producing the quasi-collimated antenna patterns 300 and field pattern 302 have no aperture taper. The pattern includes beams which are relatively parallel, and there is relatively minimal spreading, and the antenna field pattern 302 better covers the desired rectilinear zone shape as compared to the patterns 290 and 292 of FIGS. 13 and 14, respectively.

Figure 17:
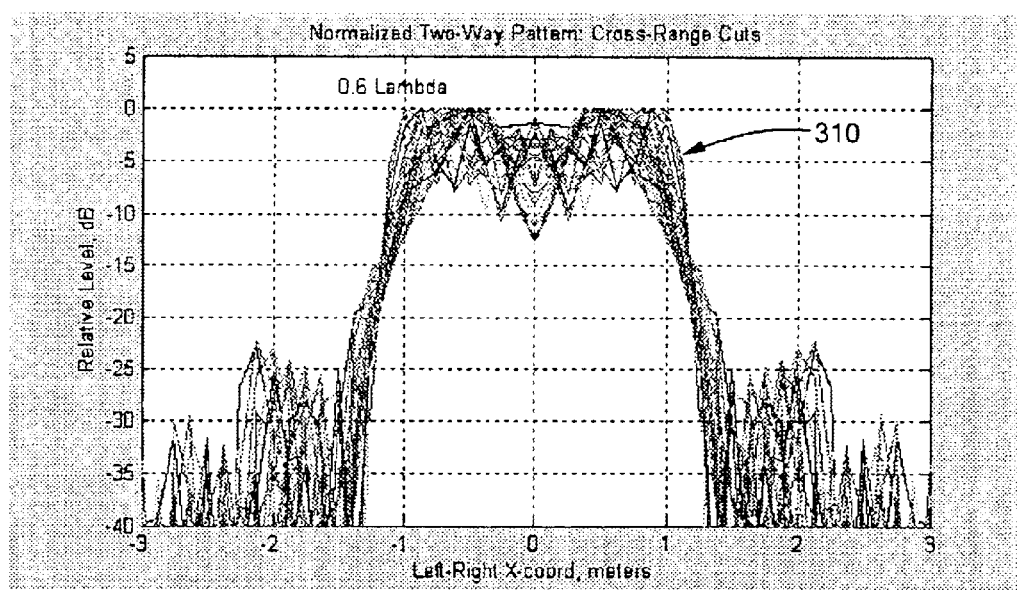
Figure 18:
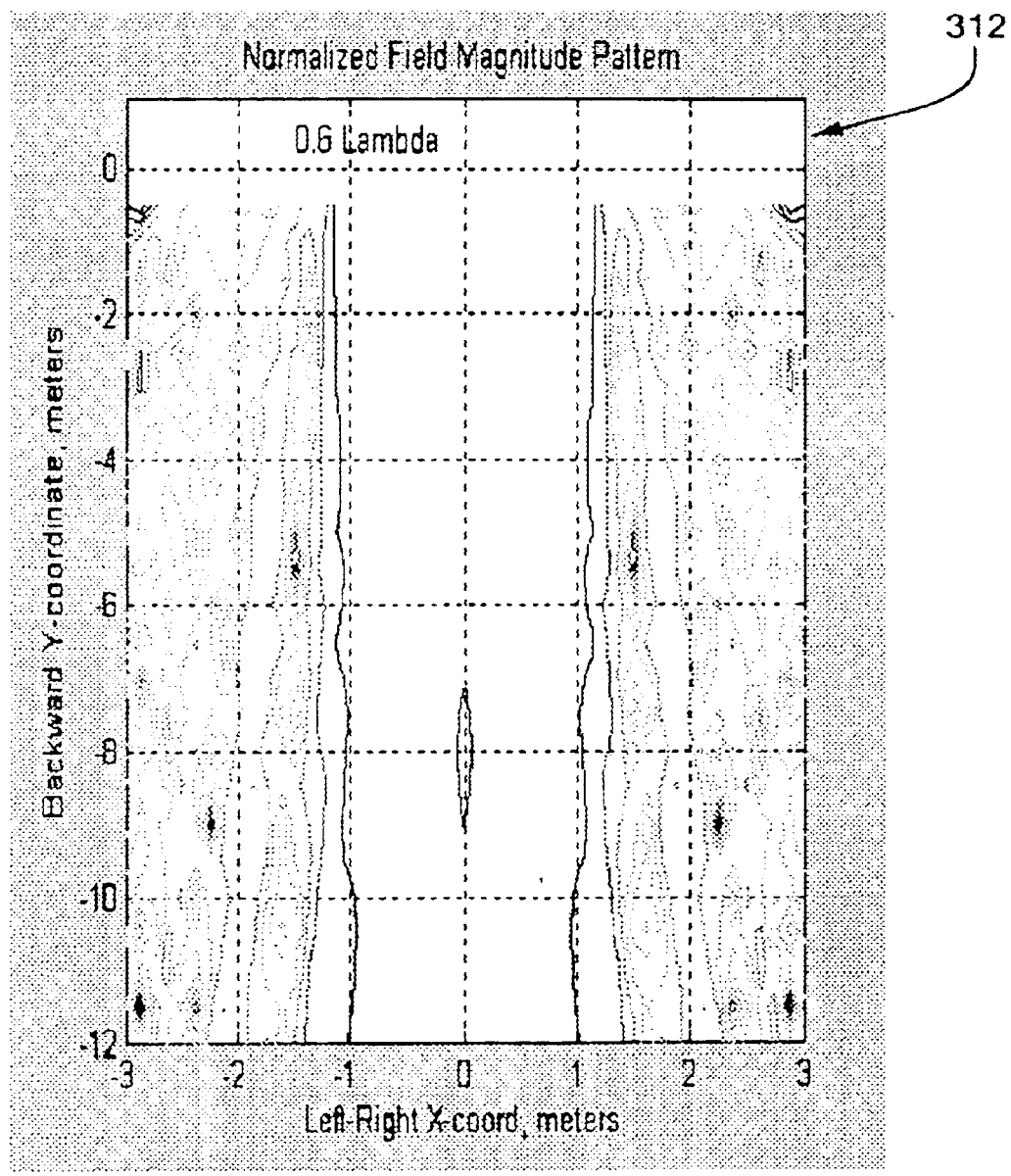

FIG. 17 shows a second exemplary quasi-collimated back-up area coverage cross-range cut pattern 310 where the spacing of the elements has been modified. FIG. 18 shows a field pattern 312 corresponding to the cross-range cuts of FIG. 17. The antenna elements producing the quasi-collimated antenna patterns 310 and 312, in the second example, still have no aperture taper, but the element spacing has been modified. The pattern 312 includes better drop-off in the left and right sides than the pattern 302 of FIG. 15 while maintaining parallel sides.

Figure 19:
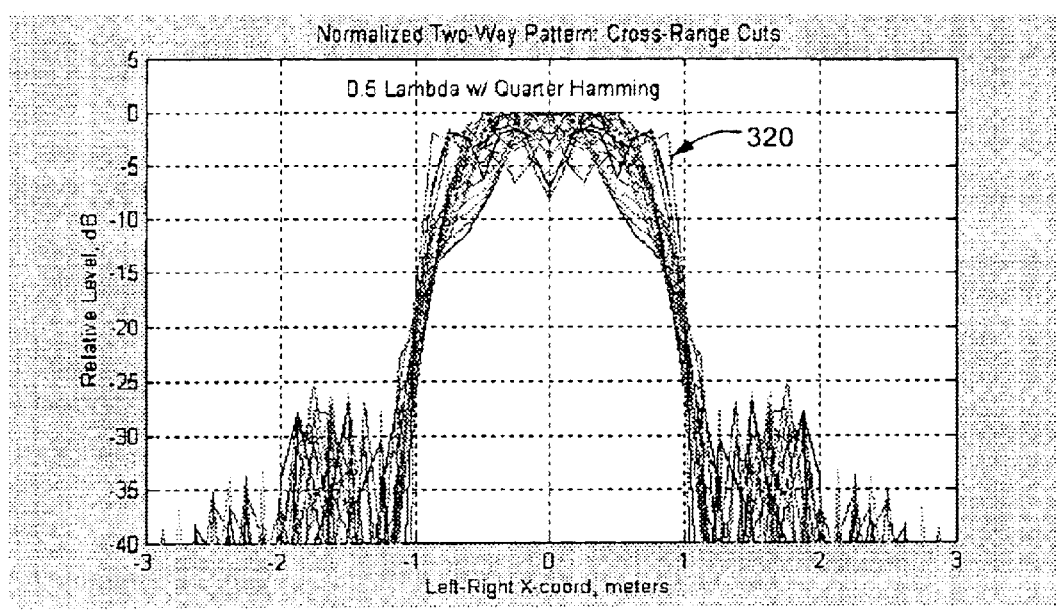
Figure 20:
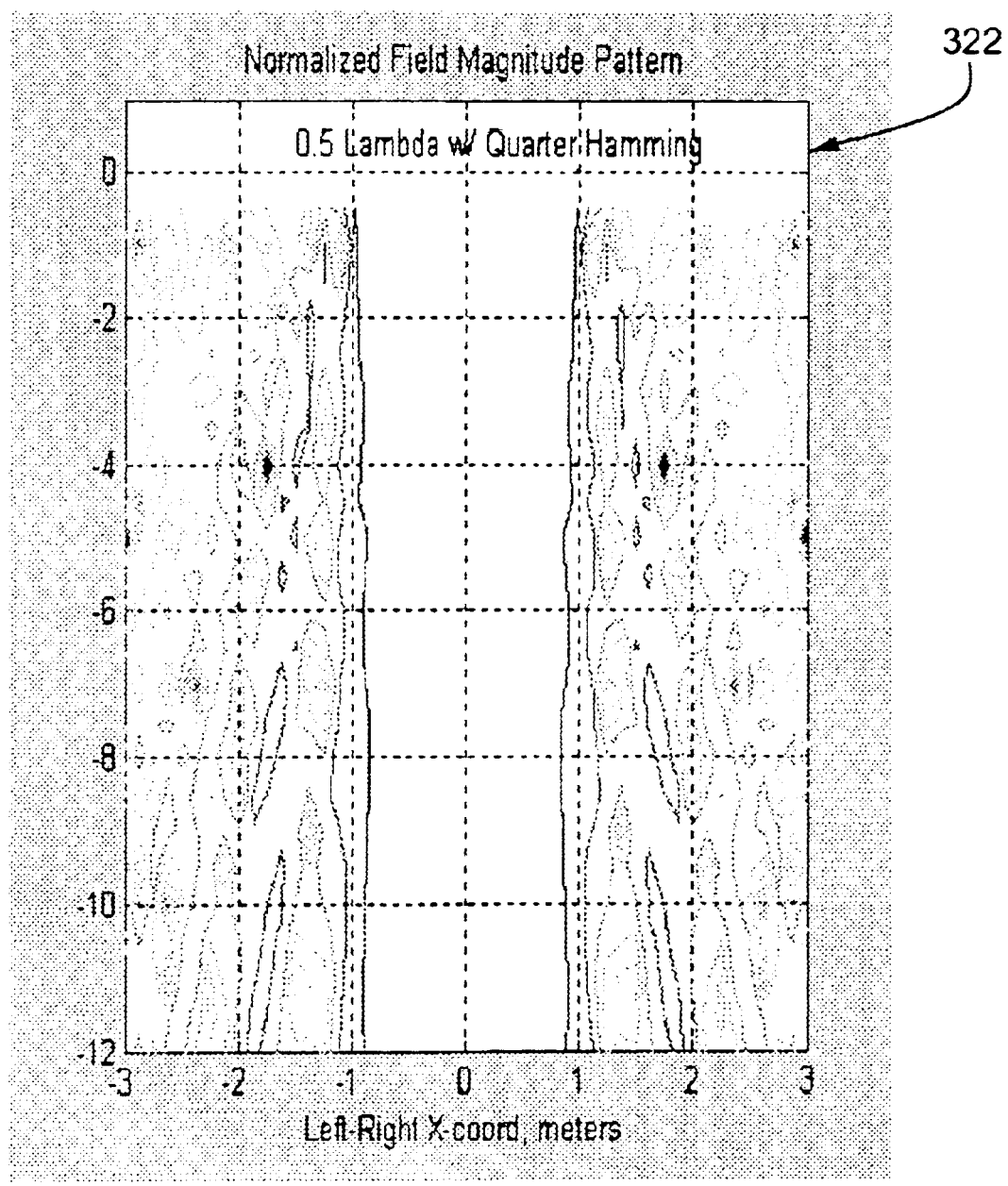

FIG. 19 shows a third exemplary quasi-collimated back-up area coverage cross-range cut pattern 320 where aperture tapering has been added, here the aperture taper weighting is a 0.25 Hamming taper, meaning that only 25% of magnitude of the conventional Hamming taper has been applied. FIG. 20 shows the field pattern 322 corresponding to the cross-range cuts of FIG. 19. The antenna elements producing the quasi-collimated antenna patterns 320 and 322 in the third example include some aperture taper. The pattern 322 includes parallel sides and provides better drop-off in left and right sides than the pattern 312 of FIG. 18, though the pattern 332 still includes some shouldering.

Figure 21:
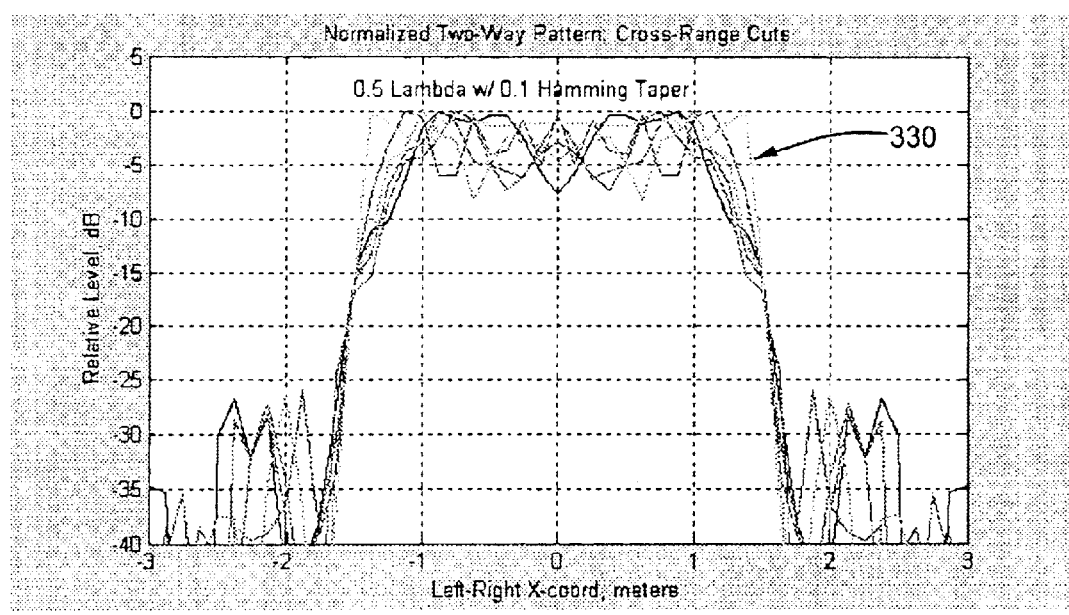
Figure 22:
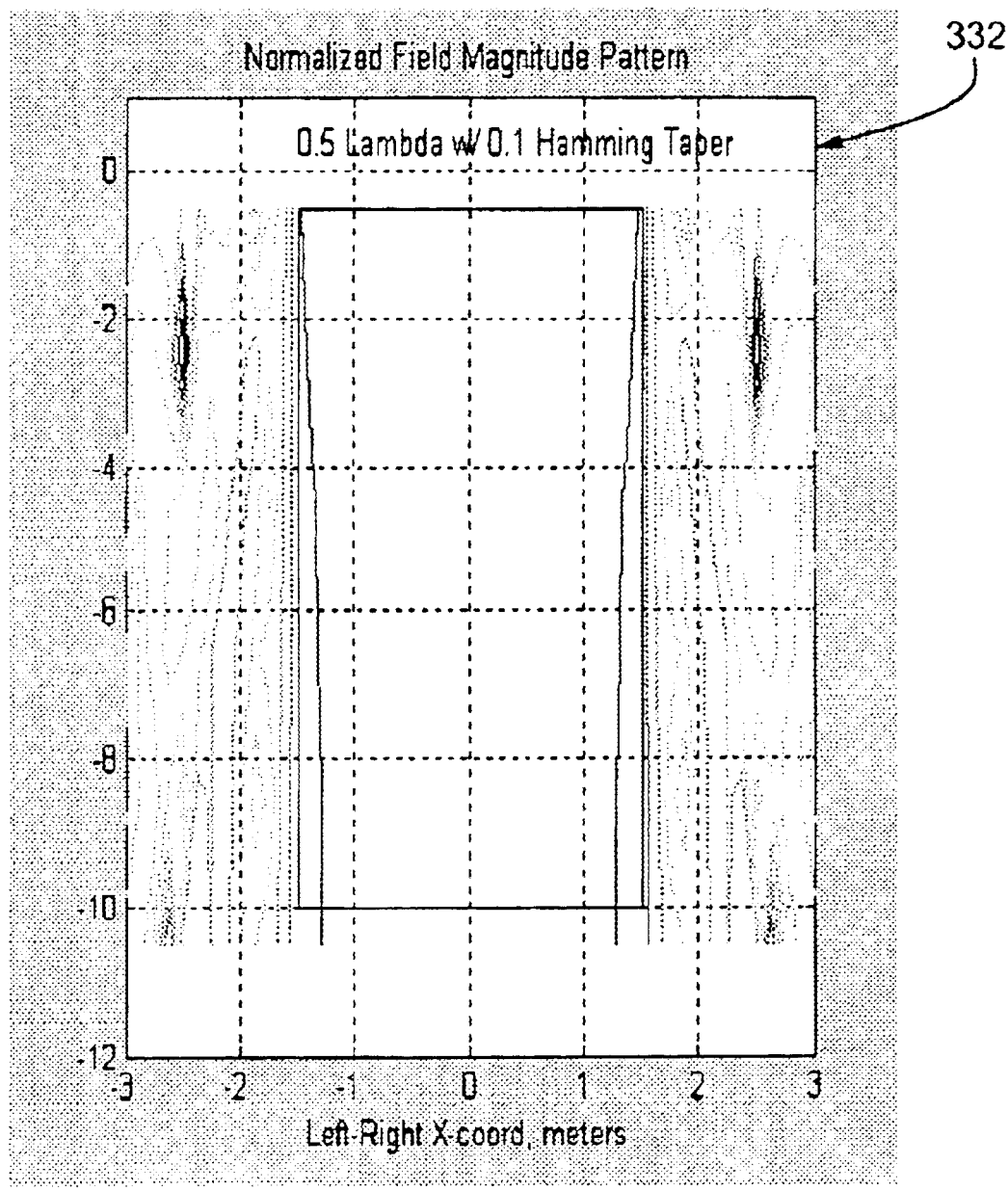

FIG. 21 shows a fourth exemplary quasi-collimated back-up area coverage cross-range cut pattern 330 where a 0.10 Hamming taper has been applied to the aperture FIG. 22 shows a field pattern 332 corresponding to the cross-range cuts of FIG. 21. The antenna elements producing the quasi-collimated antenna patterns 330, 332, in the fourth example, have a very light aperture taper, here the aperture taper weighting is 0.1. The field pattern 332 retains a parallel shape, having made the top flatter and relatively sharper than the edges on both the left and right sides.

In the embodiments described above, combinations of a rectangular and a partial Hamming taper are used to provide the quasi-collimated antenna patterns. It will be appreciated by those of ordinary skill in the art that other tapers in various combinations may be used, including but not limited to, Cosine, Raised-Cosine, Kaiser, Hann, and Blackman aperture taper weightings. In physical implementations, the aperture tapers are provided by one or more of several means, for example by changing the ratio of power division in the various legs of a corporate divider, or varying the coupling factors between individual radiating elements and the element feed lines, and the inclusion of lossy components or components with gain.

It should now be appreciated by those of ordinary skill in the art that the BUA system 10 can be provided as a stand-alone system or as part to the NOD system.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A back-up aid indication system comprising:
   a sensor for providing detection coverage in a predetermined coverage zone adjacent to a vehicle, the sensor comprising a transmit antenna including at least one subarray with multiple radiators and adapted for transmitting an RF signal having a quasi-collimated antenna pattern in a near field; and
   a waveform generator which selectively provides one of a frequency modulated continuous wave FMCW Chirp signal and a time domain pulse signal as the transmitted RF signal.

2. The system of claim 1 further comprising a receive antenna spaced apart from the transmit antenna, adapted to receive an RF signal and including a no gap adhesive to reduce a transmit-to-receive leakage.

3. The system of claim 2 further comprising:
   a receiver circuit, coupled to the receive antenna; and
   a detector coupled to the receiver circuit for determining the presence of an object proximate to the vehicle.

4. The system of claim 3 wherein the detector determines the presence of an object behind the vehicle, and provides an indication of the presence of the object to an operator of the vehicle.

5. The system of claim 3 further comprising an operator alert indicator coupled to an output of the detector for providing an indication of the presence of the object.

6. The system of claim 5 wherein the indicator is art audible indicator.

7. The system of claim 5 wherein the indicator is a visual display.

8. The system of claim 7 wherein the visual display comprises an LED indicator.

9. The system of claim 7 wherein the visual display comprises at least one of a heads-up display and a vehicle mirror display.

10. The system of claim 9 wherein an image is displayed in one of the heads-up display and the vehicle mirror display.

11. The system of claim 1 wherein the waveform generator is a pulse waveform generator.

12. The system of claim 1 further comprising:
    a mode selection port for receiving a mode request input;
    a transmit antenna switch having a control input coupled to the mode selection port and a signal input; and
    a timer circuit coupled to the waveform generator.

13. The system of claim 1 wherein the transmit antenna produces a substantially rectilinear radiation pattern for providing a backup zone disposed adjacent the rear of the vehicle.

14. The antenna of claim 1 wherein the radiators are disposed in a spaced apart arrangement for producing a substantially rectilinear radiation pattern.

15. The system of claim 1 wherein an aperture taper weighting is applied to the radiators for providing zone coverage characteristics in the near field.

16. The antenna of claim 15 wherein the aperture taper weighting is at least one of:
    a partial Hamming weighting;
    a partial Cosine weighting;
    a partial Raised-Cosine weighting;
    a partial Kaiser weighting;
    a Hann weighting; and
    a Blackman weighting.

17. The antenna of claim 16 wherein the aperture taper weighting is less than 0.25.

18. The system of claim 1 wherein the transmit antenna includes a plurality of radiators having a predetermined spacing and taper for providing zone coverage characteristics in the near field.

19. The system of claim 1 wherein the transmit antenna comprises a metalized plastic structure across the bumper fascia.

20. A back-up aid indication system comprising:
    a sensor for providing detection coverage in a predetermined coverage zone adjacent to a vehicle, the sensor comprising a transmit antenna adapted for transmitting an RF signal having a quasi-collimated antenna pattern in a near field; and
    a waveform generator which selectively provides one of a frequency modulated continuous wave FMCW Chirp signal and a time domain pulse signal as the transmitted RF signal wherein the transmit antenna comprises a flexible waveguide.

21. The system of claim 20 wherein the flexible waveguide comprises:

a housing;

plurality of flexible waveguide channels disposed within the housing each having a pair of inner surfaces and a slot surface; and at least one coax probe coupled to at least one of the plurality of flexible waveguide channels.

22. The system of claim 21 wherein predetermined ones of the flexible waveguide channels are combined to form a plurality of subarrays.

23. The system of claim 1 wherein the transmit antenna comprises:

a stripline circuit printed on adhesive plastic tape having a back side and a front side;

a metalized ground plane disposed on the back side; and a plurality of patch elements disposed on the front side.

24. A method for alerting an operator of a vehicle to the presence of a object comprising:

selectively providing one of a FMCW Chirp signal and a time domain pulse signal;

transmitting the selected signal;

providing an antenna including at least one subarray with multiple antenna elements and having a quasi-collimated antenna pattern in the near field;

detecting the presence the object proximate to the vehicle; and providing an indication of the presence of the object to the operator of the vehicle.

25. The method of claim 24 wherein providing an antenna for producing a quasi-collimated antenna pattern in the near field comprises providing a plurality of antenna elements having a predetermined aperture taper;

spacing the antenna elements relative to each other for producing the quasi-collimated antenna pattern in the near field; and coupling the selected signal to predetermined ones of the plurality of antenna elements.

26. The method of claim 25 wherein the antenna has zone coverage characteristics in the near field.

27. The method of claim 24 further comprising providing a substantially rectangular radiation pattern for providing a backup zone disposed adjacent the rear of the vehicle.

28. An external vehicle antenna comprising:

a housing disposed across a bumper fascia;

a plurality of flexible waveguide channels disposed within the housing each having a pair of inner surfaces and a slot surface; and at least one coax probe coupled to at least one of the plurality of flexible waveguide channels.

29. The antenna of claim 28 wherein the housing comprises injection molded plastic having a metallic coating on the inner surfaces.

30. The antenna of claim 28 further comprising at least one coax probe clip mechanism adapted to fasten the at least one coax probe predetermined ones of the plurality of flexible waveguide channels.

31. The antenna of claim 28 further comprising a cover disposed on the housing adjacent the plurality of flexible waveguide channels and the at least one coax probe.

* * * * *

UNITED STATES PATENT AND TRADEMARK OFFICE
CERTIFICATE OF CORRECTION

PATENT NO. : 6,873,250 B2
DATED : March 29, 2005
INVENTOR(S) : Viana et al.

It is certified that error appears in the above-identified patent and that said Letters Patent is hereby corrected as shown below:

Column 1,
Line 40, delete ",trucks boats" and replace with -- , trucks, boats, --.

Column 6,
Lines 65-66, delete "of vehicle" and replace with -- of the vehicle --.

Column 11,
Line 18, delete "selective coupled" and replace with -- selectively coupled --.
Line 58, delete "subarray" and replace with -- subarrays --.

Column 12,
Line 13, delete "elsewhere the rear of vehicle" and replace with -- elsewhere at the rear of the vehicle --.
Line 19, delete "in a left" and replace with -- in left --.
Line 39, delete "zone 70' zone is" and replace with -- zone 70' is --.

Column 13,
Line 38, delete "and are provided" and replace with -- are provided --.

Column 14,
Lines 35-36, delete "transmission lines," and replace with -- transmission line, --.
Line 41, delete "the includes" and replace with -- this includes --.

Column 15,
Line 48, delete "individual element" and replace with -- individual elements --.

UNITED STATES PATENT AND TRADEMARK OFFICE
CERTIFICATE OF CORRECTION

PATENT NO. : 6,873,250 B2
DATED : March 29, 2005
INVENTOR(S) : Viana et al.

It is certified that error appears in the above-identified patent and that said Letters Patent is hereby corrected as shown below:

<u>Column 18,</u>
Line 14, delete "is art" and replace with -- is an --.

<u>Column 19,</u>
Line 7, delete "plurality" and replace with -- a plurality --.
Line 29, delete "presence the object" and replace with -- presence of the object --.

<u>Column 20,</u>
Line 3, delete "comprises" and replace with -- comprises: --.

Signed and Sealed this

Seventh Day of February, 2006

JON W. DUDAS
*Director of the United States Patent and Trademark Office*